US012812230B2

(12) United States Patent
Miyazaki

(10) Patent No.: US 12,812,230 B2
(45) Date of Patent: Nov. 24, 2026

(54) ELECTRONIC APPARATUS, CONNECTION DETECTING METHOD, AND STORAGE MEDIUM

(71) Applicant: CANON KABUSHIKI KAISHA, Tokyo (JP)

(72) Inventor: Sho Miyazaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 516 days.

(21) Appl. No.: 18/488,147

(22) Filed: Oct. 17, 2023

(65) Prior Publication Data

US 2024/0137639 A1 Apr. 25, 2024
US 2024/0236470 A9 Jul. 11, 2024

(30) Foreign Application Priority Data

Oct. 21, 2022 (JP) ................................. 2022-169001

(51) Int. Cl.
*H04N 23/57* (2023.01)
*G03B 17/18* (2021.01)
(Continued)

(52) U.S. Cl.
CPC ............. *H04N 23/57* (2023.01); *G03B 17/18* (2013.01); *G03B 17/56* (2013.01); (Continued)

(58) Field of Classification Search
CPC ........ H04N 23/57; H04N 23/65; G03B 17/18; G03B 17/56; G03B 2206/00; (Continued)

(56) References Cited

U.S. PATENT DOCUMENTS

2005/0094180 A1* 5/2005 Nishimoto ......... G03G 15/5004 358/1.14
2009/0040058 A1* 2/2009 Sato ...................... H01M 10/48 340/636.1

(Continued)

FOREIGN PATENT DOCUMENTS

JP 2013-033216 A 2/2013

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

An electronic apparatus includes a battery for supplying power, a lock unit attachable to a first electronic apparatus, and a processor configured to output, after the electronic apparatus is attached to the first electronic apparatus, a connection signal to the first electronic apparatus indicating that the electronic apparatus has been attached to the first electronic apparatus. The processor is configured to determine, based on information about a state of the battery, whether the electronic apparatus can receive communication with the first electronic apparatus, determine whether the lock unit is in a lock state for locking a connection of the electronic apparatus to the first electronic apparatus or in an unlock state for unlocking the connection, and output the connection signal in a case where the electronic apparatus can receive the communication with the first electronic apparatus and the lock unit is in the unlock state.

13 Claims, 14 Drawing Sheets

(51) Int. Cl.
*G03B 17/56* (2021.01)
*H04N 23/65* (2023.01)

(52) U.S. Cl.
CPC .... *G03B 2206/00* (2013.01); *G03B 2217/007* (2013.01); *H04N 23/65* (2023.01)

(58) Field of Classification Search
CPC ........................ G03B 2217/007; H04W 76/10; H04M 1/026; H04M 1/0262
See application file for complete search history.

(56) References Cited

U.S. PATENT DOCUMENTS

2013/0002942 A1* 1/2013 Motoki ................ H04N 23/663 348/372
2013/0010134 A1* 1/2013 Motoki .................. H04N 23/74 348/207.99
2016/0011887 A1* 1/2016 Chung .................... G06F 8/654 713/2
2020/0007739 A1* 1/2020 Sugiyama .............. H04N 23/55
2022/0070788 A1* 3/2022 Wu ................... H04W 52/0277

* cited by examiner

| | 1ST BYTE | 2ND BYTE | 3RD BYTE | ... | (N-2)TH BYTE | (N-1)TH BYTE | NTH BYTE |
|---|---|---|---|---|---|---|---|
| MOSI DATA | CMD | MOSI_DATA1 | MOSI_DATA2 | ... | MOSI_DATA[N-3] | CheckSum_C | 0x00 |
| MISO DATA | 0xA5 | CMD | MISO_DATA1 | ... | MISO_DATA[N-4] | 0x00 | CheckSum_A |

FIG. 3

| ADDRESS | D7 | D6 | D5 | D4 | D3 | D2 | D1 | D0 |
|---|---|---|---|---|---|---|---|---|
| 0x00 | ACC TYPE | | | | | | | |
| 0x01 | ACC ID NO. | | | | | | | |
| 0x02 | FIRMWARE VER. | | | | | | | |
| 0x03 | POWER SUPPLY DURING POWER-OFF | | POWER SUPPLY DURING AUTOMATIC POWER-OFF | | POWER SUPPLY SPECIFICATION | | CHARGEABILITY | |
| 0x04 | REQUEST POWER | | | | | | | |
| 0x05 | FIRMWARE UPDATE MODE | FIRMWARE UPDATE FUNCTION | INTERMEDIATE ACCESSORY OPERATION PERMISSION | | INTERMEDIATE ACCESSORY CONFIRMATION AT START | | I2C COMMAND COMMUNICATION AVAILABILITY | |
| 0x06 | RESERVE | | COMMUNICATION REQUEST FACTOR ACQUIRING METHOD | | FUNCTIONAL SIGNAL 4 | FUNCTIONAL SIGNAL 3 | FUNCTIONAL SIGNAL 2 | FUNCTIONAL SIGNAL 1 |
| 0x07 | RESERVE | | | | | | | |
| 0x08 | RESERVE | | | | | | | |
| 0x09 | RESERVE | | | | | | | |
| 0x0A | SILENT START | COMMUNICATION REQUEST FACTOR | | | | | | |
| 0x0B | RESERVE | | | | | | | |
| 0x0C | RESERVE | | | | | | SPI PROTOCOL | CS LOGIC |
| 0x0D | COMMUNICATION INTERVAL BETWEEN SPI BYTES | | | | | | | |
| 0x0E | COMMUNICATION INTERVAL BETWEEN SPI BYTES (IN FIRMWARE UPDATE MODE) | | | | | | | |
| 0x0F | CHECKSUM | | | | | | | |

FIG. 4

| NO. | TYPE |
|---|---|
| 0x00 | RESERVE |
| 0x01 | RESERVE |
| : | : |
| 0x80 | RESERVE |
| 0x81 | STROBE |
| 0x82 | INTERFACE CONVERSION ADAPTER |
| 0x83 | MICROPHONE |
| 0x84 | MULTI-ACCESSORY CONNECTION ADAPTER |
| 0x85 | RESERVE |
| 0x86 | RESERVE |
| 0x87 | RESERVE |
| 0x88 | RESERVE |
| 0x89 | RESERVE |
| 0x90 | RESERVE |
| : | : |
| 0xFF | RESERVE |

FIG. 6

| FACTOR NO. | FACTOR CONTENT |
|---|---|
| 0x00 | PRESS OF MENU CALL SW |
| 0x01 | VOICE STABILIZATION COMPLETION |
| 0x02 | VOICE UNMUTE |
| 0x03 | |
| 0x04 | |
| 0x05 | |
| 0x06 | |
| 0x07 | |
| : | |
| 0x79 | |
| 0x7A | |
| 0x7B | |
| 0x7C | |
| 0x7D | |
| 0x7E | |
| 0x7F | |

FIG. 7

| | COMMUNICATION INTERVAL |
|---|---|
| 0 | 1us |
| 1 | 2us |
| 2 | 5us |
| 3 | 10us |
| 4 | 15us |
| 5 | 25us |
| 6 | 50us |
| 7 | 100us |

FIG. 8A

| | COMMUNICATION INTERVAL |
|---|---|
| 0 | 1ms |
| 1 | 2ms |
| 2 | 5ms |
| 3 | 10ms |
| 4 | 20ms |
| 5 | 50ms |
| 6 | 80ms |
| 7 | 100ms |

FIG. 8B

ELECTRONIC APPARATUS, CONNECTION DETECTING METHOD, AND STORAGE MEDIUM

BACKGROUND

Technical Field

One of the aspects of the embodiments relates generally to an electronic apparatus, and more particularly to control of connection signals in an electronic apparatus having a battery.

Description of Related Art

One conventional connection detecting method of an electronic apparatus is configured as follows: A connection detecting terminal is pulled up on the side of an electronic apparatus (first electronic apparatus) that detects a connection, and a connection detecting terminal is connected to ground (GND) on the side of an electronic apparatus (second electronic apparatus) to be connected. In a case where the second electronic apparatus is connected to the first electronic apparatus, the connection is detected because the potential of the connection detecting terminal on the side of the first electronic apparatus is grounded. Thereafter, an initial communication starting sequence starts. This sequence supplies power from the first electronic apparatus to the second electronic apparatus, activates the second electronic apparatus, and in a case where the second electronic apparatus becomes ready for initial communication, the second electronic apparatus sends a communication request signal to the first electronic apparatus. Thereafter, the first electronic apparatus confirms the content of the communication request and performs the initial communication.

In a case where the second electronic apparatus is a bus-powered device that has no power supply, the above sequence will be executed without any problems.

Japanese Patent Laid-Open No. 2013-033216 discloses an electronic apparatus that suppresses an increase in the number of contacts and reduces the influence of noise caused by a clock signal on signals of adjacent contacts in relation to the connection detecting method described above.

However, the connection detecting method of Japanese Patent Laid-Open No. 2013-033216 may not be able to respond to communication from the first electronic apparatus during the initial communication starting sequence, in a case where the second electronic apparatus is a self-powered device that has a power supply such as a battery, and includes a power switch, and the power switch of the second electronic apparatus is turned off. As a result, even if the connection is normal, the first electronic apparatus may display a communication error.

For example, in attaching an external strobe (second electronic apparatus) as an accessory to a camera (first electronic apparatus), a normal user may fix the external strobe to the camera while the external strobe is powered off. This operation may improperly cause a communication error to be displayed on the camera even if the connection is normal.

SUMMARY

An electronic apparatus according to one aspect of the embodiment includes a battery for supplying power, a lock unit attachable to a first electronic apparatus, and a processor configured to output, after the electronic apparatus is attached to the first electronic apparatus, a connection signal to the first electronic apparatus indicating that the electronic apparatus has been attached to the first electronic apparatus. The processor is configured to determine, based on information about a state of the battery, whether the electronic apparatus can receive communication with the first electronic apparatus, determine whether the lock unit is in a lock state for locking a connection of the electronic apparatus to the first electronic apparatus or in an unlock state for unlocking the connection, and output the connection signal in a case where the electronic apparatus can receive the communication with the first electronic apparatus and the lock unit is in the unlock state. A connection detecting method of the above electronic apparatus also constitutes another aspect of the embodiment. A storage medium storing a program that causes a computer to execute the above connection detecting method also constitutes another aspect of the embodiment.

Further features of the disclosure will become apparent from the following description of embodiments with reference to the attached drawings.

BRIEF DESCRIPTION OF THE DRAWINGS

FIG. 3 illustrates an example of SPI communication contents according to this embodiment.

FIG. 4 illustrates an example of accessory information according to this embodiment.

FIG. 6 illustrates an example of accessory type information in this embodiment.

FIG. 7 illustrates an example of factor numbers and factor contents of communication requests according to this embodiment.

FIGS. 8A and 8B illustrate an example of communication data interval information of the SPI communication according to this embodiment.

DESCRIPTION OF THE EMBODIMENTS

Figure 1:
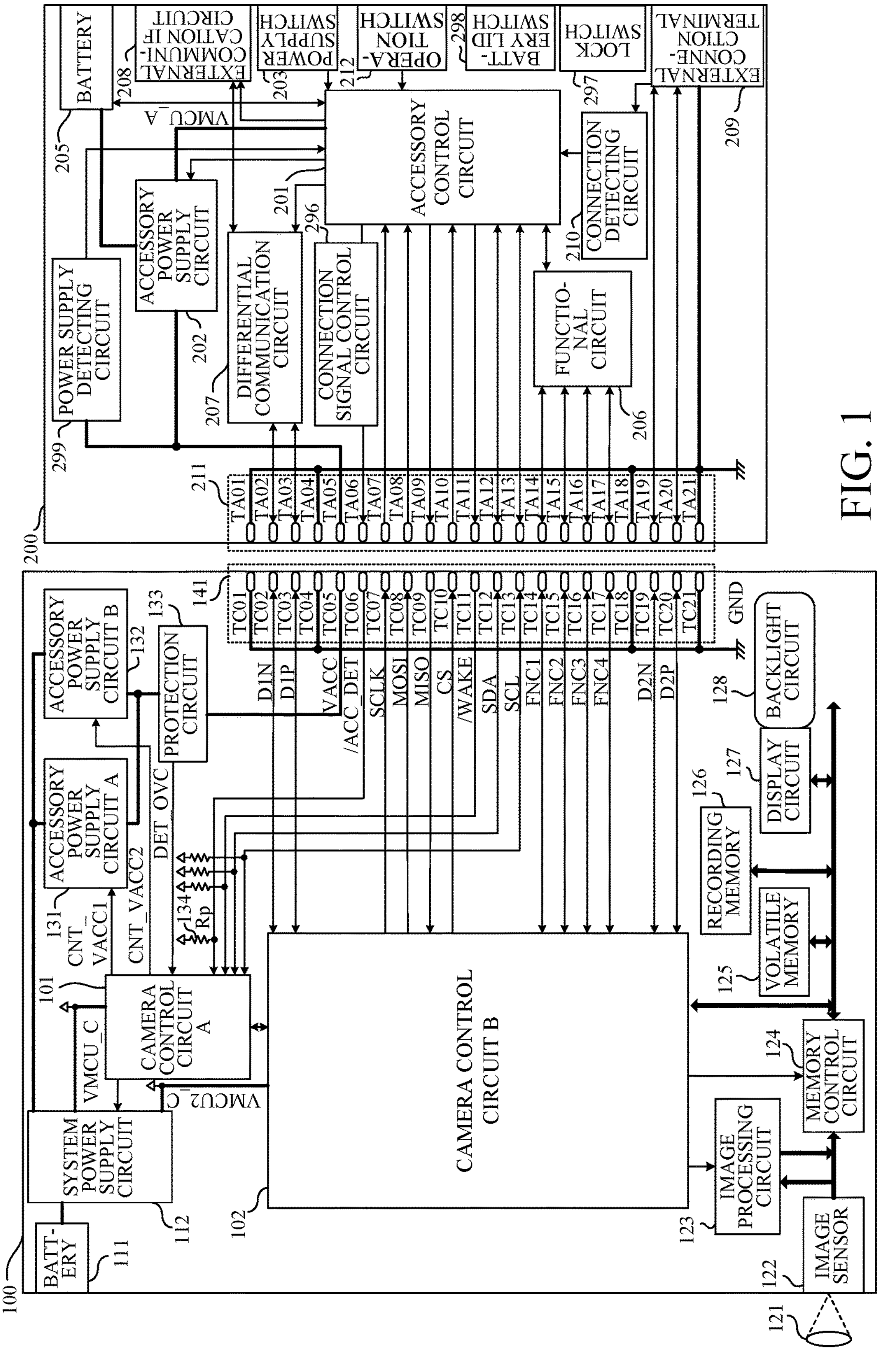
FIG. 1 illustrates an example of the configurations of a camera and an accessory according to this embodiment.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

FIG. 1 illustrates electrical configurations of a camera (first electronic apparatus) 100 as an electronic apparatus according to this embodiment and an accessory 200 as an electronic apparatus attachable to and detachable from the camera 100. The camera 100 includes a camera connector 141 having a plurality of contacts (terminals) TC01 to TC21. The accessory 200 includes an accessory connector 211 having a plurality of contacts TA01 to TA21. The camera 100 and the accessory 200 are electrically connected by one-to-one contact between the plurality of contacts (terminals) TC01 to TC21 of the camera connector 141 and the plurality of contacts TA01 to TA21 of the accessory connector 211.

The camera 100 is supplied with power from a battery 111. The battery 111 is removable from the camera 100. A camera control circuit A 101 and a camera control circuit B 102 as control units of the camera 100 are circuits for controlling the entire camera 100, and include a microcomputer containing a CPU and the like.

The camera control circuit A 101 monitors unillustrated switches for operating the camera. The camera control circuit A 101 operates even in a case where the camera 100 is in a standby state (low power consumption mode) and controls the system power according to the user's operation. The camera control circuit B 102 controls an image sensor 122, a display circuit 127, and the like, and stops operating in a case where the camera 100 is in the standby state (low power consumption mode).

The system power supply circuit 112 is a circuit that generates power to be supplied to each circuit in the camera 100, and includes a DC/DC converter circuit, a Low Drop Out (LDO), a charge pump circuit, and the like. The camera control circuit A 101 is always supplied with a voltage of 1.8V generated by the system power supply circuit 112 from the battery 111 as camera microcomputer power supply VMCU_C. Several types of voltages generated by the system power supply circuit 112 are supplied to the camera control circuit B 102 as camera microcomputer power supply VMCU2_C at arbitrary timings. The camera control circuit A 101 controls turning on and off of power supply to each circuit in the camera 100 by controlling the system power supply circuit 112.

An optical lens 121 is attachable to and detachable from the camera 100.

Light from an object incident through the optical lens 121 is imaged on the image sensor 122 such as a CMOS sensor or a CCD sensor. An object image formed on the image sensor 122 is encoded into a digital imaging signal. An image processing circuit 123 performs image processing such as noise reduction processing and white balance processing for the digital imaging signal to generate image data, and converts the image data into an image file in a JPEG format or the like in order to record the image data in a recording memory 126. The image processing circuit 123 generates VRAM image data to be displayed on the display circuit 127 from the generated image data.

A memory control circuit 124 controls the transmission and reception of image data and other data generated by the image processing circuit 123. A volatile memory 125 is a high-speed readable and writable memory such as DDR3 SDRAM, and is used as a workspace for image processing that is performed by the image processing circuit 123. The recording memory 126 is a readable and writable recording medium such as an SD card or a CFexpress card that is attachable to and detachable from the camera 100 via an unillustrated connector. The display circuit 127 is a display disposed on a back surface of the camera 100, and includes an LCD panel, an organic EL display panel, or the like. A backlight circuit 128 adjusts the luminance of the display circuit 127 by changing a backlight amount of the display circuit 127.

Each of an accessory power supply circuit A 131 and an accessory power supply circuit B 132 as power supply unit is a voltage conversion circuit that converts the voltage supplied from the system power supply circuit 112 into a predetermined voltage and generates 3.3 V as accessory power supply VACC in this embodiment.

The accessory power supply circuit A 131 is a power supply circuit with low self-power consumption that includes an LDO. The accessory power supply circuit B 132 is a circuit that includes a DC/DC converter circuit and can pass a current larger than that of the accessory power supply circuit A 131. The self-power consumption of the accessory power supply circuit B 132 is larger than that of the accessory power supply circuit A 131. Therefore, in a case where the load current is small, the accessory power supply circuit A 131 is more efficient than the accessory power supply circuit B 132, and in a case where the load current is large, the accessory power supply circuit B 132 is more efficient than the accessory power supply circuit A 131. The camera control circuit A 101 controls turning on and off of the voltage outputs of the accessory power supply circuit A 131 and the accessory power supply circuit B 132 according to the operation state of the accessory 200.

A protection circuit 133 as a protection unit includes a current fuse element, a poly-switch element, or an electronic fuse circuit that combines a resistor, an amplifier, and a switch element. The protection circuit 133 outputs overcurrent detecting signal DET_OVC in a case where power current values supplied to the accessory 200 from the accessory power supply circuits A 131 and B 132 are higher than a predetermined value and becomes excessive (abnormal). In this embodiment, the protection circuit 133 is the electronic fuse circuit, and notifies the camera control circuit A 101 of the overcurrent detecting signal DET_OVC in a case where a current of 1 A or more flows. The overcurrent detecting signal DET_OVC indicates the overcurrent by becoming at the high level (Hi).

The camera connector 141 is a connector for an electrical connection with the accessory 200 via 21 contacts TC01 to TC21 that are arranged in a row. The contacts TC01 to TC21 are arranged in this order from one end to the other end in this arrangement direction.

TC01 is connected to the ground (GND) and serves not only as a reference potential contact but also as a contact for controlling the wiring impedance of differential signals D1N and D1P.

The differential signal D1N that is connected to TC02 and the differential signal D1P that is connected to TC03 are differential data communication signals for performing data communications in pairs, and are connected to the camera control circuit B 102. TC02, TC03, TC07 to TC17, TC19, and TC20, which will be described below, are communication contacts.

TC04 is connected to GND and serves as a reference potential contact for camera 100 and accessory 200. TC04 is disposed outside TC05 described below in the contact arrangement direction.

The accessory power supply VACC generated by the accessory power supply circuit A 131 and the accessory power supply circuit B 132 is connected to TC05 as a power supply contact via the protection circuit 133.

An accessory attachment detecting signal /ACC_DET is connected to TC06 as an attachment detecting contact. The accessory attachment detecting signal /ACC_DET is pulled up to the camera microcomputer power supply VMCU_C via resistance element Rp134 (10 kΩ). The camera control circuit A 101 can detect whether or not the accessory 200 is attached by reading a signal level of the accessory attachment detecting signal /ACC_DET. In a case where the signal level (potential) of the accessory attachment detecting signal /ACC_DET is high level (predetermined potential), it is detected that the accessory 200 is not attached. On the other hand, in a case where the signal level (potential) of the accessory attachment detecting signal /ACC_DET is low (Lo) level (GND potential as described below), the accessory 200 is detected as an attachment state.

SCLK connected to TC07, MOSI connected to TC08, MISO connected to TC09, and Chip Select (CS) connected to TC10 are signals for Serial Peripheral Interface (SPI) communication in which the camera control circuit B 102 becomes a communication master. In this embodiment, the SPI communication has a communication clock frequency of 1 MHz, a data length of 8 bits (1 byte), a bit order of MSB first, and a full-duplex communication method.

In this embodiment, the camera 100 and the accessory 200 can support two types of communication protocols as the SPI communication method.

The first communication protocol is a method that does not confirm whether the accessory 200 is in a communicable state before the camera 100 outputs SCLK, and will be referred to as SPI protocol A in this embodiment.

Figure 2A:
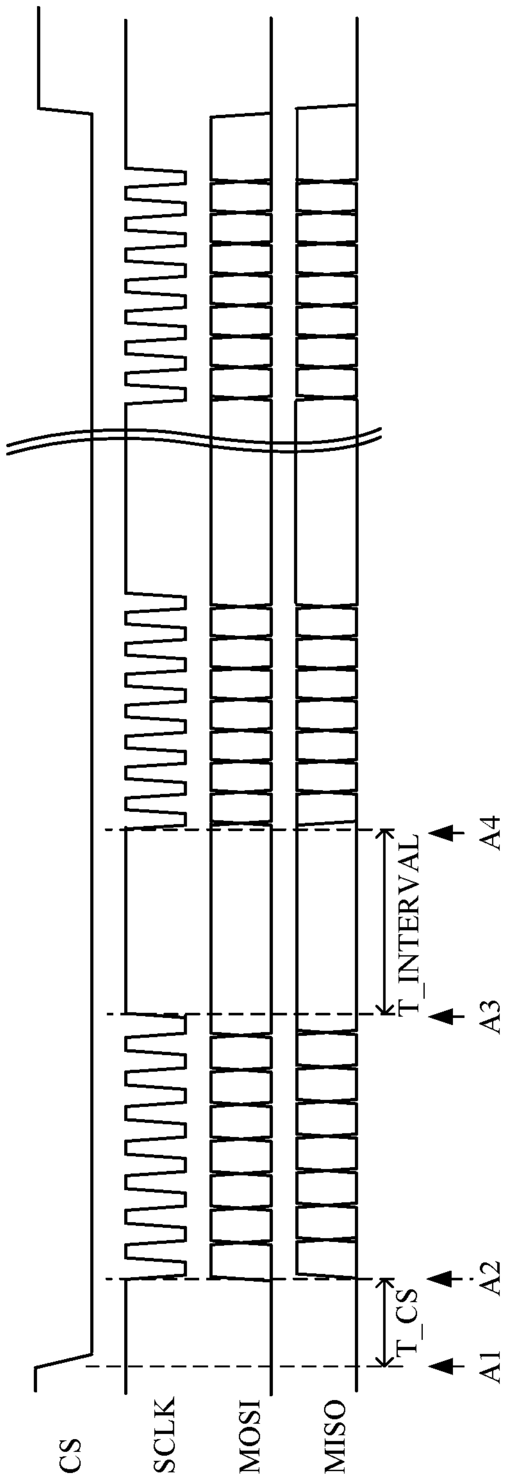
FIG. 2A schematically illustrates a communication waveform of SPI protocol A according to this embodiment.

FIG. 2A schematically illustrates a communication waveform of SPI protocol A. In FIG. 2A, a CS signal is low-active. The camera control circuit B 102 changes CS to low level at timing A1 and requests the accessory control circuit 201 for the SPI communication. At timing A2 predetermined time T_CS after timing A1, the camera control circuit B 102 starts outputting SCLK and MOSI. Similarly, the accessory control circuit 201 starts outputting MISO in a case where the accessory control circuit 201 detects a trailing edge of SCLK. The camera control circuit B 102 stops outputting the SCLK at timing A3 in a case where the SCLK output for one byte is completed. The camera control circuit B 102 stops outputting SCLK from timing A3 until a predetermined time T_INTERVAL elapses, resumes the output of SCLK at timing A4 after T_INTERVAL has elapsed, and performs the next 1-byte communication.

Figure 2B:
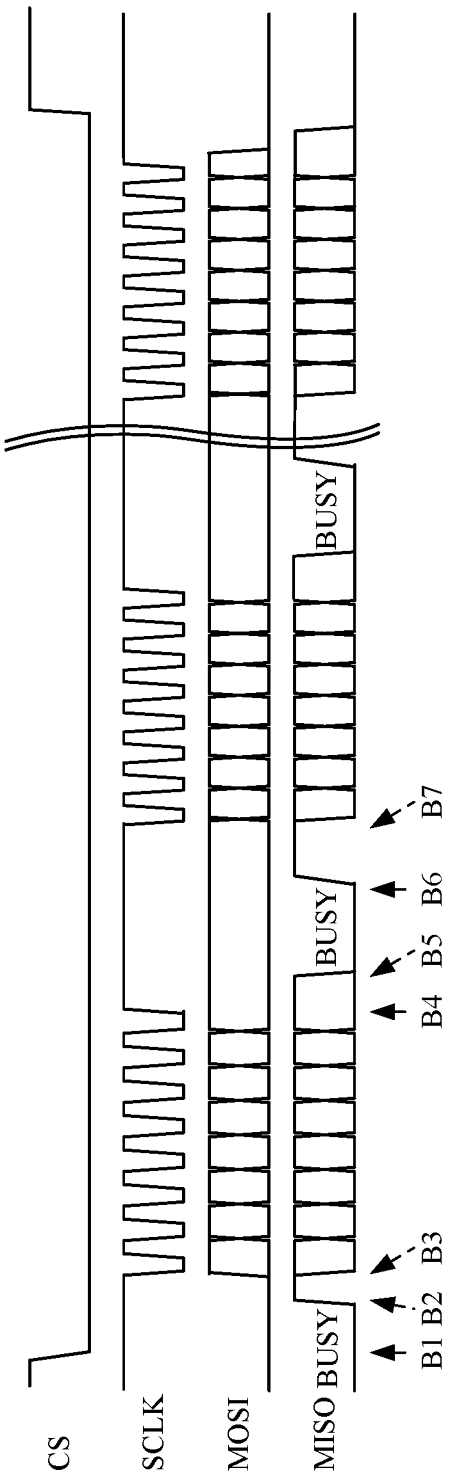
FIG. 2B schematically illustrates a communication waveform of SPI protocol B according to this embodiment.
Figure 2C:
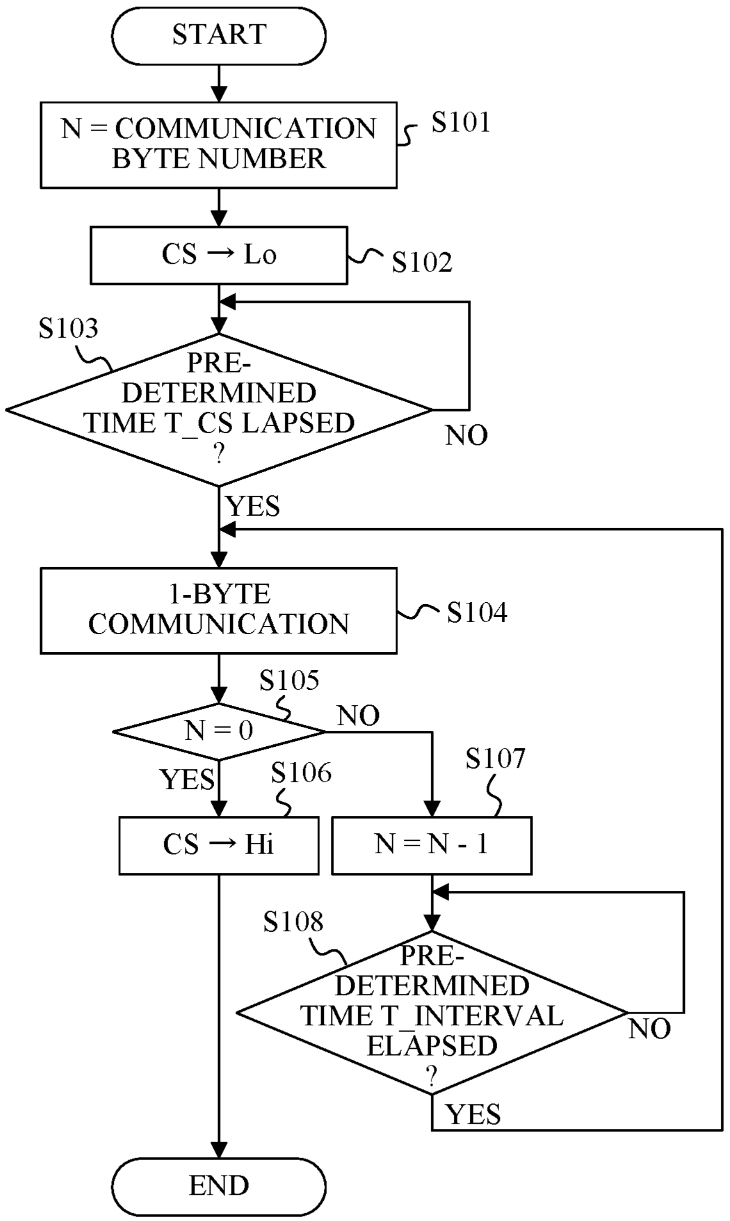
FIG. 2C illustrates an operation flow of a camera control circuit B in the SPI protocol A according to this embodiment.

FIG. 2C is a flowchart illustrating an operation of the camera control circuit B 102 in the SPI protocol A. In S101, the camera control circuit B 102 stores in the internal variable N a numerical value indicating the number of bytes to be communicated. For example, 3 is stored in a case of 3-byte communication. In S102, the camera control circuit B 102 changes CS to low level and requests for the SPI communication. In S103, the camera control circuit B 102 changes CS to low level and then performs wait processing until predetermined time T_CS elapses. After the predetermined time T_CS has elapsed, the flow proceeds to S104. In S104, the camera control circuit B 102 controls an SCLK output, a MOSI data output, and a MISO data input and performs 1-byte data communication. In S105, the camera control circuit B 102 determines whether or not the internal variable N indicating the number of communication bytes is 0. In a case where the internal variable N is 0, the flow proceeds to S106. In a case where the internal variable N is other than 0, the flow proceeds to S107. In S107, the camera control circuit B 102 stores as a new internal variable N a value obtained by decrementing the value of the internal variable N indicating the number of communication bytes by 1. In S108, the camera control circuit B 102 performs wait processing until predetermined time T_INTERVAL elapses after the 1-byte data communication in S104 is completed. After the predetermined time T_INTERVAL elapses, the flow returns to the processing of S104, and the same processing is executed again. In S106, the camera control circuit B 102 changes CS to high level and ends a series of SPI communications.

Figure 2D:
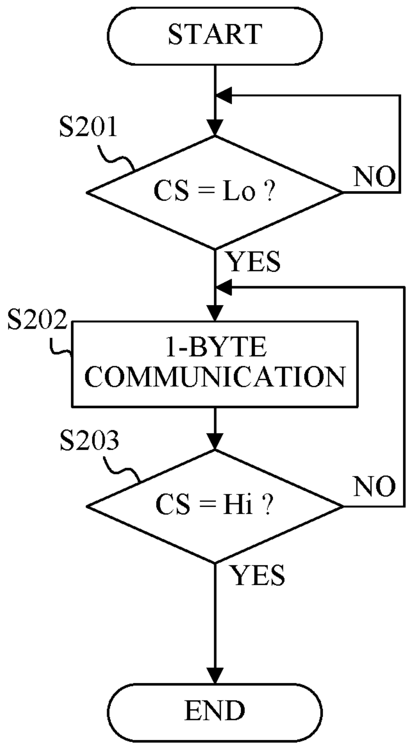
FIG. 2D illustrates an operation flow of an accessory control circuit in the SPI protocol A according to this embodiment.

FIG. 2D illustrates an operation flow of the accessory control circuit 201 in the SPI protocol A. In S201, the accessory control circuit 201 determines whether CS has changed to low level. In a case where CS has changed to low, the flow proceeds to S202. In a case where CS has not changed to low level, the flow returns to S201. In S202, the accessory control circuit 201 performs the 1-byte data communication by the MOSI data input control and the MISO data output control according to the SCLK signal input. In S203, the accessory control circuit 201 determines whether CS has changed to high level. In a case where CS has changed to high level, the accessory control circuit 201 determines that the SPI communication has been completed. In a case where CS has not changed to high level, the flow returns to S202 to perform the next 1-byte communication.

The second communication protocol is a method of determining whether or not the accessory 200 is in a communicable state before the camera 100 outputs SCLK and will be referred to as SPI protocol B in this embodiment.

FIG. 2B schematically illustrates the communication waveform of the SPI protocol B. At timing B1, the camera control circuit B 102 changes CS to low level and requests the accessory control circuit 201 for the SPI communication. Along with the communication request, the camera control circuit B 102 determines the potential of MISO. In a case where it is high level, it determines that the accessory control circuit 201 is in a communicable state, and in a case where it is low level, the accessory control circuit 201 is in an incommunicable state. On the other hand, upon detecting a trailing edge of CS, the accessory control circuit 201 controls MISO to high level in a case where the SPI communication is available, and controls MISO to low level in a case where SPI communication is unavailable (B2). In a case where the camera control circuit B 102 determines that MISO is at high level at timing B3, it starts outputting SCLK and MOSI. Similarly, the accessory control circuit 201 starts outputting MISO when detecting a trailing edge of SCLK. The camera control circuit B 102 stops outputting SCLK in a case where a 1-byte SCLK output is completed at timing B4. After the 1-byte data is transmitted and received, the accessory control circuit 201 controls MISO to high level in a case where the SPI communication is available, and controls MISO to low level in a case where the SPI communication is unavailable (B5, B6). At timing B7, the camera control circuit B 102 determines the potential of MISO. In a case where it is high level, it determines that the accessory control circuit 201 is in a communicable state. In a case where it is low level, it determines that the accessory control circuit 201 is in an uncommunicable state.

Figure 2E:
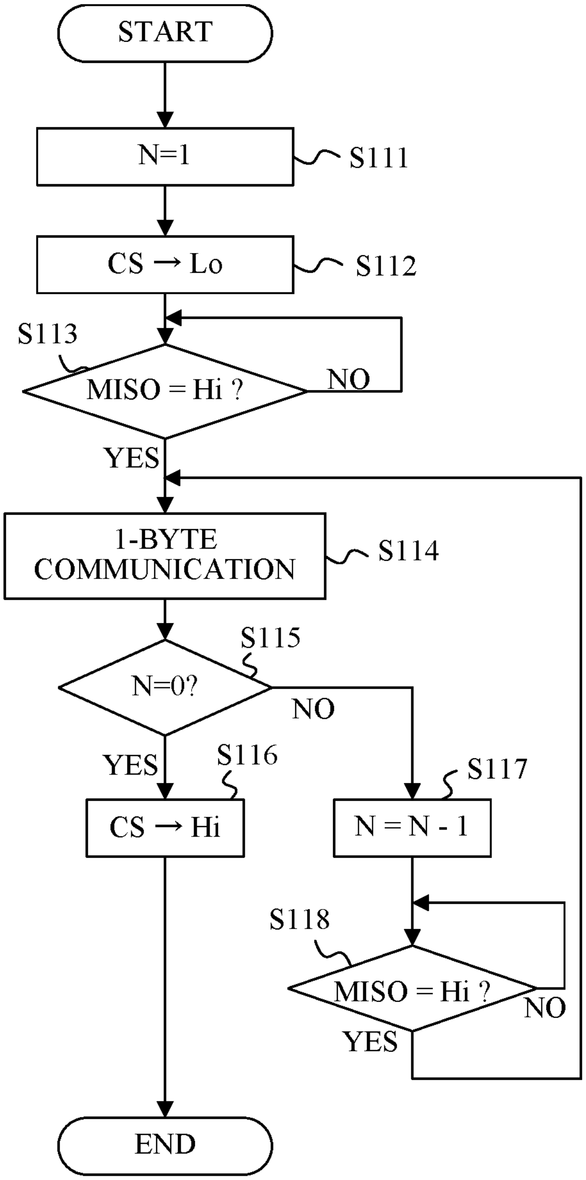
FIG. 2E illustrates an operation flow of the camera control circuit B in the SPI protocol B according to this embodiment.

FIG. 2E illustrates an operation flow of the camera control circuit B 102 in the SPI protocol B. In S111, the camera control circuit B 102 stores a value indicating the number of bytes to be communicated in the internal variable N. For example, 3 is stored for 3-byte communication. In S112, the camera control circuit B 102 changes CS to low level and requests for SPI communication. In S113, the camera control circuit B 102 determines whether MISO has changed to high level. In a case where MISO is at high level, the flow proceeds to S114. In a case where MISO is not at high level, the flow returns to S113. In S114, the camera control circuit B 102 controls an SCLK output, a MOSI data output, and a MISO data input for 1-byte data communication. In S115, the camera control circuit B 102 determines whether or not the internal variable N indicating the number of communication bytes is 0. In a case where the internal variable N is 0, the flow proceeds to S116. In a case where the internal variable N is other than 0, the flow proceeds to S117. In S117, the camera control circuit B 102 stores, as a new internal variable N a value obtained by decrementing the value of the internal variable N indicating the number of communication bytes by 1. In S118, the camera control circuit B 102 determines whether MISO has changed to high level. In a case where MISO is at high level, the flow proceeds to S114. In a case where MISO is not at high level, the flow returns to S118. In S116, the camera control circuit B 102 changes CS to high level, and ends a series of SPI communications.

Figure 2F:
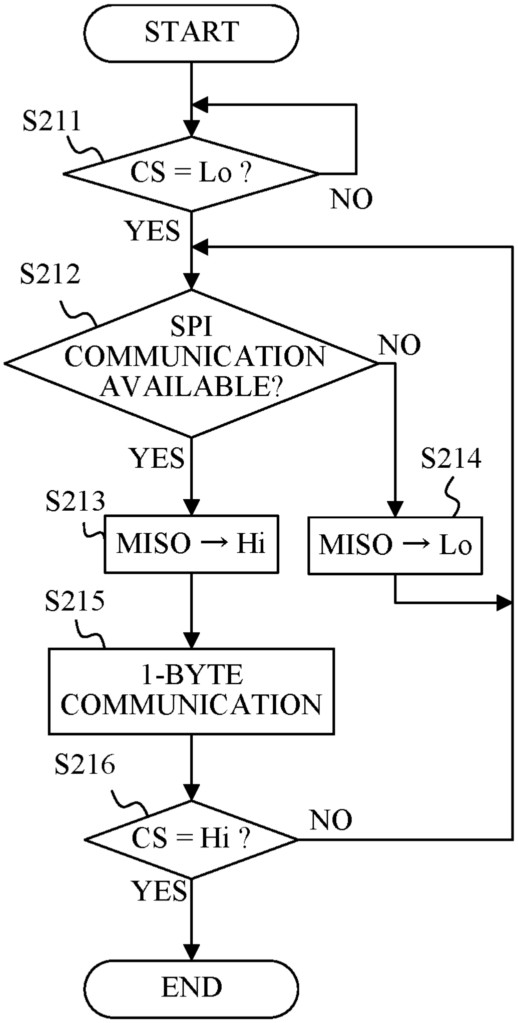
FIG. 2F illustrates an operation flow of the accessory control circuit in SPI protocol B according to this embodiment.

FIG. 2F illustrates an operation flow of the accessory control circuit 201 in the SPI protocol B. In S211, the accessory control circuit 201 determines whether CS has changed to low level. In a case where CS has changed to low level, the flow proceeds to S212. In a case where CS has not changed to low level, the flow returns to S211. In S212, the accessory control circuit 201 determines whether SPI communication is available. In a case where the SPI communication is available, the flow proceeds to S213. In a case where SPI communication is unavailable, the flow proceeds to S214. In S213, the accessory control circuit 201 controls MISO to high level, and the flow proceeds to S215. In S214, the accessory control circuit 201 controls MISO to low level, and the flow returns to S212. In S215, the accessory control circuit 201 controls a MOSI data input and a MISO data output according to the SCLK signal input and performs 1-byte data communication. In S216, the accessory control circuit 201 determines whether CS has changed to high level. In a case where CS has changed to high level, the accessory control circuit 201 determines that the SPI communication has been completed. In a case where CS has not changed to high level, the flow returns to S212 for the next 1-byte communication.

FIG. 3 illustrates communication contents in notifying an operation execution instruction (command) from the camera 100 to the accessory 200 by the SPI communication in this embodiment. The camera control circuit B 102 transmits as MOSI data information CMD indicating a command number to the accessory control circuit 201 in the first-byte communication. The accessory control circuit 201 transmits as MISO data a value of 0xA5, which is information indicating the communicable state. The accessory control circuit 201 transmits a value other than 0xA5 as MISO data in a case where the first-byte communication processing cannot be executed. The camera control circuit B 102 transmits argument MOSI_DATA1 corresponding to the command number CMD in the second-byte communication. The camera control circuit B 102 similarly transmits the arguments MOSI_DATA2 to MOST DATA[N−3] corresponding to the command number CMD from the third byte to the (N−2)-th byte. In the second-byte communication, the accessory control circuit 201 transmits the command number CMD received in the first byte as MISO data to the camera control circuit B 102. Thereby, the camera control circuit B 102 can determine that the accessory control circuit 201 has correctly received the MOSI data. The accessory control circuit 201 transmits return value MISO_DATA1 corresponding to the command number CMD as MISO data in the third-byte communication. The accessory control circuit 201 similarly transmits arguments MISO_DATA2 to MISO_DATA[N−4] corresponding to the command number CMD from the fourth byte to the (N−2)-th byte. Assume that the number of arguments and return values are previously determined for each command number. One or both of the argument and the return value may be omitted. The camera control circuit B 102 transmits checksum data CheckSum_C as MOSI data to the accessory control circuit 201 in the (N−1)-th byte communication. The checksum data CheckSum_C is a value calculated by the following equation:

$$\text{CheckSum\_C}=\text{EXOR}(\text{AND}(\text{SUM}(\text{CMD}, \text{MOSI\_DATA1}, \ldots, \text{MOSI\_DATA}[N-3]), 0xFF), 0xFF)$$

The accessory control circuit 201 transmits 0x00 as MISO data in the (N−1)-th byte communication. The camera control circuit B 102 transmits 0x00 as MOSI data in the N-th byte communication.

In the N-th byte communication, the accessory control circuit 201 transmits checksum data CheckSum_A as MISO data. The checksum data CheckSum_A is calculated by one of the following equations. In a case where the value of CheckSum_C received by the accessory control circuit 201 in the (N−1)-th-byte communication matches the value of CheckSum_C calculated by the camera control circuit B 102, CheckSum_A is calculated by the following equation.

CheckSum_A=EXOR(AND(SUM(0xA5,CMD,MISO_DATA1, . . . ,MOSI_DATA[N−4]),0xFF), 0xFF)

In a case where the value of CheckSum_C received by the accessory control circuit 201 in the (N−1)-th-byte communication does not match the value of CheckSum_C calculated by the camera control circuit B 102, CheckSum_A is calculated by the following equation.

CheckSum_A=AND(SUM(0xA5,CMD, MISO_DATA1, . . . ,MOSI_DATA[N−4]),0xFF)

A communication request signal /WAKE for requesting communication from the accessory 200 to the camera control circuit A 101 is connected to TC11. The communication request signal /WAKE is pulled up to the camera microcomputer power supply VMCU_C via a resistor. The camera control circuit A 101 can receive a communication request from the accessory 200 by detecting the trailing edge of the communication request signal /WAKE.

SDA connected to TC12 and SCL connected to TC13 are signals for performing Inter-Integrated Circuit (I2C) communication with the camera control circuit A 101 acting as a communication master. SDA and SCL are open-drain communications pulled up to the camera microcomputer power supply VMCU_C, and have the communication frequency of 100 kbps in this embodiment.

FIG. 4 illustrates an example of accessory information that the accessory 200 has in a nonvolatile memory (not illustrated). As illustrated in FIG. 4, the accessory information is mapped in the memory space at addresses 0x00 to 0x0F. The accessory information can be read out of the accessory 200 by the I2C communication. In the I2C communication of this embodiment, a checksum value for read data is added as the final data of the communication. A detailed description of the accessory information will be given below.

An FNC1 signal connected to TC14, an FNC2 signal connected to TC15, an FNC3 signal connected to TC16, and an FNC4 signal connected to TC17 are function signals whose function is variable according to the type of attached accessory 200. For example, in a case where the accessory 200 is a microphone device, the function signal is a voice (audio) data signal. In a case where the accessory 200 is an illumination device (strobe device), the function signal is a signal that notifies the light emission timing.

TC18 is connected to GND and is a contact that serves as a reference potential for the camera 100 and the accessory 200, similarly to TC04. A differential signal D2N connected to TC19 and a differential signal D2P connected to TC20 are data communication signals for performing data communications in pairs, and are connected to the camera control circuit B 102.

TC21 is connected to GND and serves not only as a reference potential contact but also as a contact for controlling the wiring impedance of the differential signals D2N and D2P.

The accessory 200 has a battery 205 and receives power supply from the battery 205. The battery 205 includes an unillustrated battery microcomputer, and the battery microcomputer includes a one-chip microcomputer (microcomputer IC). The battery microcomputer includes a communication function unit and a battery level detector that monitors the battery level. The battery microcomputer acquires and records various types of battery information, converts it into communication data, and communicates it to the accessory control circuit 201, which will be described below.

A battery lid switch (battery lid detector) 298 is provided near the battery lid that is opened in replacing the battery 205 stored in the compartment and is connected to the accessory control circuit 201 as battery lid state detecting signal BATDORCLS. By reading the signal level of the battery lid state detecting signal BATDORCLS, the accessory control circuit 201 can detect the state of the battery lid (opening and closing state of the battery lid). In a case where the signal level (potential) of the battery lid state detecting signal BATDORCLS is high level (predetermined potential), the accessory control circuit 201 detects that the battery lid is closed. In a case where the signal level (potential) of the battery lid state detecting signal BATDORCLS is low level (GND battery), the accessory control circuit 201 detects that the battery lid is open. In a case where the accessory control circuit 201 detects that the battery lid is opened, the accessory control circuit 201 switches from the operating mode, which is a mode for operating the accessory 200, to the same stop mode as that when the power switch 203 is in the turning-off position. This is to prevent problems even when the battery 205 is removed.

The accessory control circuit 201 as a control unit for the accessory 200 is a circuit that controls the entire accessory 200, and is a microcomputer containing a CPU and the like.

An accessory power supply circuit 202 is a circuit that generates power to be supplied to each circuit in the accessory 200, and includes a DC/DC converter circuit, LDO, and a charge pump circuit. The accessory control circuit 201 is constantly supplied with a voltage of 1.8 V generated by the accessory power supply circuit 202 as accessory microcomputer power supply VMCU_A. Controlling the accessory power supply circuit 202 can provide turning-on and turning-off control over the power supply to each circuit in the accessory 200.

A power supply detecting circuit (power supply detector) 299 is a circuit that detects the voltage supplied from the camera 100 and outputs a high-level signal to the accessory control circuit 201 in a case where it determines that the voltage is equal to or higher than a predetermined voltage at which initial communication can be started. The power supply detecting circuit 299 includes a reset IC or an AD port of the accessory control circuit 201.

A differential communication circuit 207 is a circuit for performing differential communication with the camera 100 and can transmit and receive data to and from the camera 100. An external communication interface (IF) circuit 208 is an IF circuit for performing data communication with an unillustrated external device, such as an Ethernet communication IF, a wireless LAN communication IF, and a public network communication IF.

The accessory control circuit 201 controls the differential communication circuit 207 and the external communication IF circuit 208 to transmit data received from the camera 100 to the external device or transmit data received from the external device to the camera.

The functional circuit 206 is a circuit having different functions depending on the type of accessory 200. For example, in a case where the accessory 200 is a strobe device, it may be a light emitting circuit or a charging circuit. In a case where the accessory 200 is a microphone device, it is a voice codec circuit, a microphone circuit, and the like.

An external connection terminal 209 is a connector terminal for connecting with an external device, and is a USB TYPE-C connector in this embodiment. A connection detecting circuit 210 is a circuit for detecting that an external device has been connected to the external connection terminal 209, and the accessory control circuit 201 can detect the connection of the external device to the external connection terminal 209 by receiving an output signal of the connection detecting circuit 210.

A power switch 203 is a switch for turning on and off the operation of the accessory 200. The accessory control circuit 201 can detect the turning-on position and turning-off position by reading the signal level of a terminal to which the power switch 203 is connected.

An operation switch 212 is a switch for operating the accessory 200 and includes a button, a cross key, a slide switch, a dial switch, and the like. In a case where the operation switch 212 is operated, the accessory control circuit 201 can detect that the operation switch 212 has been operated, and executes predetermined processing according to the operation of the operation switch 212.

A lock switch (lock unit) 297 is a mechanical member and switch for attaching the accessory 200 to the camera 100 and fixing (locking) the accessory 200 to the camera 100 with the camera connector 141 and the accessory connector 211 connected. The lock switch 297 includes a mechanical member such as a lever switch provided near the accessory connector 211 and a member for detecting a state of the switch. In locking the connection with the camera 100, the mechanical member is interlocked with turning on the lock switch 297, and when a pin protrudes from the vicinity of the accessory connector 211 and is inserted into a hole on the side of the camera 100, the accessory 200 is fixed to the camera 100. A member for detecting the state of the switch includes a flexible printed circuit (FPC) board and a conductive rubber. In a case where the lock switch 297 is turned on, the conductive rubber comes into contact with the FPC pattern and conducts two signals in the FPC board. One of the two signals in the FPC pattern is connected to GND. The other is connected to a terminal of the accessory control circuit 201 as lock switch state detecting signal /SHOELOCKSW_DET and pulled up to accessory microcomputer power supply VMCU_A via an unillustrated resistance element (470 kΩ). The accessory control circuit 201 can detect the state of the lock switch 297 by reading the signal level of lock switch state detecting signal /SHOE LOCKSW_DET. In a case where the signal level (potential) of the lock switch state detecting signal /SHOE LOCKSW_DET is high level (predetermined potential), the state of the lock switch 297 is detected to be turning-off (unlock state for unlocking (unfixing) the connection of the accessory 200 to the camera 100). In a case where the signal level (potential) of the lock switch state detecting signal /SHOELOCKSW_DET is low level (GND potential), the state of the lock switch 297 is detected to be turning-on (lock state for locking (fixing) the connection of the accessory 200 to the camera 100). The lock switch state detecting signal /SHOELOCKSW_DET is connected to a terminal such as an interrupt port among the terminals of the accessory control circuit 201 that can detect a change in state even if the accessory 200 is in the low power consumption mode.

The accessory 200 transitions to a low power consumption mode that consumes less power than the operating mode in the following cases. For example, the camera 100 is not connected to the accessory 200, the power switch 203 of the accessory 200 is in a state other than the turning-off position, and the accessory 200 has not been operated for a predetermined period of time. Alternatively, after the accessory 200 is connected to the camera 100 and receives communication from the camera 100 that the camera 100 enters the low power consumption mode, the power switch 203 is in the state other than the turning-off position and the accessory 200 is continuously unoperated for a predetermined time.

An accessory connector 211 is a connector electrically connectable to the camera 100 via 21 contacts TA01 to TA21 that are arranged in a row. The contacts TA01 to TA21 are arranged in this order from one end to the other in the arrangement direction.

TA01 is connected to GND and serves not only as a reference potential contact but also as a contact for controlling wiring impedances of the differential signals D1N and D1P.

The differential signal D1N connected to TA02 and the differential signal D1P connected to TA03 are data communication signals that perform data communication in pairs and are connected to the differential communication circuit 207. TA02, TA03, TA07 to TA17, TA19 and TA20, which will be described below, are communication contacts.

TA04 is connected to GND and serves as a reference potential contact for the camera 100 and the accessory 200. TA04 is disposed outside TA05 described below in the contact arrangement direction.

The power supply detecting circuit 299 described above is connected to TA05 as a power contact, and the accessory power supply VACC supplied from the camera 100 is connected.

TA06 as an attachment detecting contact is connected to the connection signal control circuit 296. In a case where the accessory control circuit 201 determines that the accessory control circuit 201 can receive communication with the camera 100 and that the lock switch 297 is turned on, the accessory control circuit 201 controls the connection signal control circuit 296. As a result, the accessory control circuit 201 sets the accessory attachment detecting signal /ACC_DET to GND level (ground potential) as low level (outputs the connection signal to the camera 100), thereby allowing the camera 100 to detect the attachment of the accessory 200. The connection signal is a signal indicating that the accessory 200 has been attached to the camera 100. The accessory control circuit 201 stop outputting the connection signal in a case where the accessory control circuit 201 determines at least one of that the accessory control circuit 201 cannot receive communication with the camera 100, and that the lock switch 297 is turned off. The connection signal control circuit 296 includes an FET or the like. The gate of the FET is connected to the accessory attachment detecting signal control EN_ACC_DET of the accessory control circuit 201, the source is connected to GND, and the drain is connected to TA06.

Whether or not the accessory control circuit 201 can receive communication with the camera 100 is determined based on information about the state of the battery 205. Although the details will be described below, this embodiment makes a determination based on the state of the battery lid switch 298, the state of the power switch 203, and the state of the battery level (remaining capacity or life) of the battery 205.

SCLK connected to TA07 MOSI connected to TA08, MISO connected to TA09, and CS connected to TA10 are signals for the accessory control circuit 201 to perform the SPI communication as a communication slave.

A communication request signal /WAKE for requesting communication from the accessory control circuit 201 to the camera 100 is connected to TA11. In a case where the accessory control circuit 201 determines that communication with the camera 100 is necessary, the accessory control circuit 201 issues a communication request to the camera 100 by setting the output of the communication request signal /WAKE to low level. Setting the output of the communication request signal /WAKE to low level is also performed in requesting initial communication after the attachment of the accessory 200 is detected. The accessory control circuit 201 controls the connection signal control circuit 296 to set the accessory attachment detecting signal /ACC_DET to low level. Thereafter, the accessory power supply VACC is supplied from the camera 100 to the accessory 200, and the output of the power supply detecting circuit 299 is inputted to the accessory control circuit 201. Thereafter, the accessory control circuit 201 sets the output of the communication request signal /WAKE to low level.

SDA connected to TA12 and SCL connected to TA13 are signals for the I2C communication with the accessory control circuit 201 as a communication slave.

An FNC1 signal connected to TA14, an FNC2 signal connected to TA15, an FNC3 signal connected to TA16, and an FNC4 signal connected to TA17 are function signals whose functions can be changed according to the type of accessory 200. For example, in a case where the accessory 200 is a microphone device, the function signal becomes an audio data signal. In a case where the accessory 200 is a strobe unit, the function signal becomes a signal that notifies a light emission timing.

TA18 is connected to GND and serves as a reference potential contact for the camera 100 and the accessory 200, similarly to TA04. The differential signal D2N connected to TA 19 and the differential signal D2P connected to TA20 are data communication signals paired for data communication, and are connected to the external connection terminal 209.

TA21 is connected to GND, and serves not only as a reference potential contact but also as a terminal for controlling the wiring impedances of the differential signals D2N and D2P.

Figure 5:
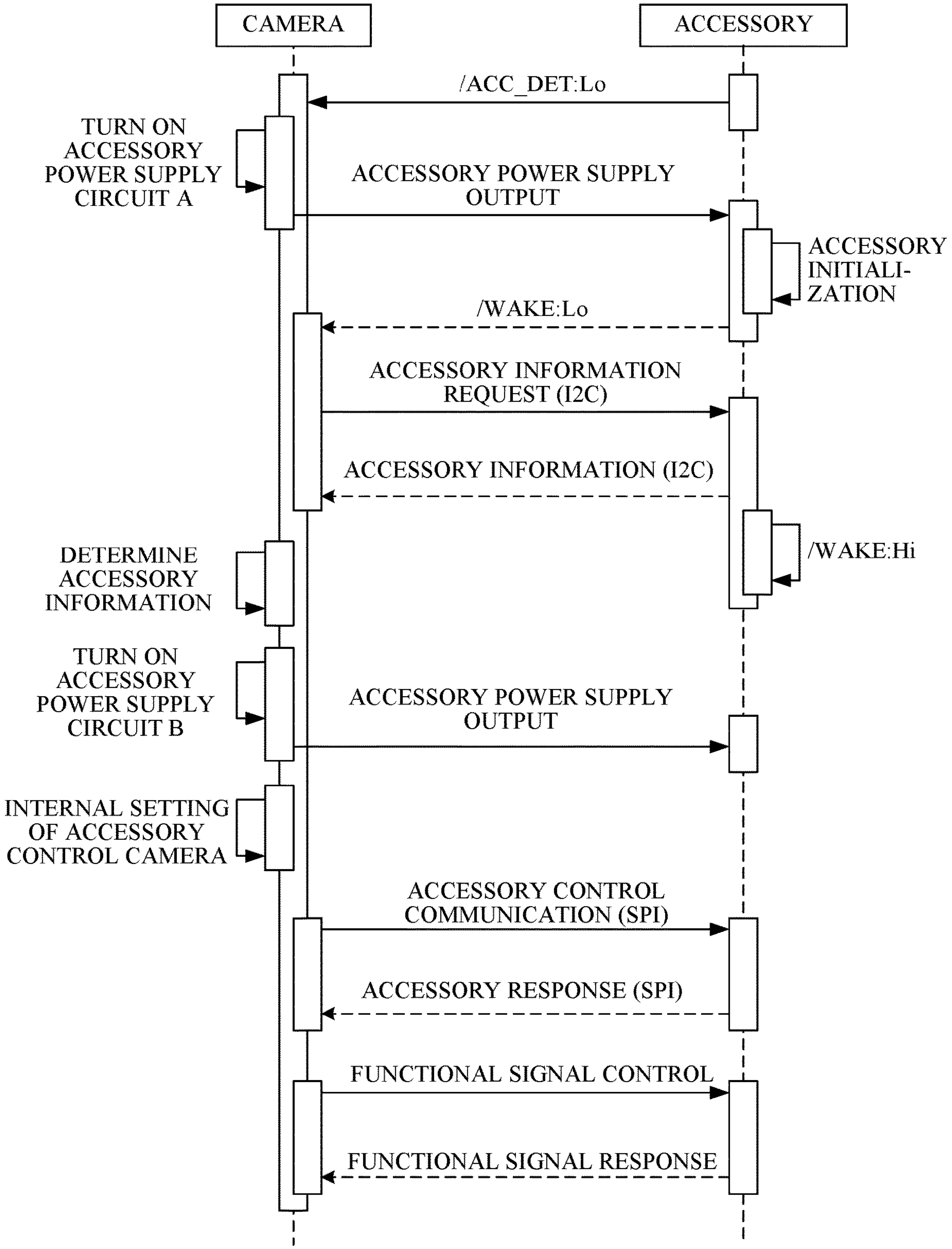
FIG. 5 illustrates an example of an operation sequence of the camera and accessory according to this embodiment.

FIG. 5 is a sequence diagram illustrating an example of processing in a case where the accessory 200 is attached to the camera 100. Details of the processing of the camera 100 and the accessory 200 will be described below.

The accessory 200 is attached to the camera 100. Thereafter, in a case where the accessory control circuit 201 determines that the accessory control circuit 201 can receive communication with the camera 100 and the lock switch 297 is turned on, the accessory control circuit 201 controls the connection signal control circuit 296. As a result, the accessory attachment detecting signal /ACC_DET becomes GND level, and the camera control circuit A 101 determines that the accessory has been attached. Details of determining whether or not the accessory control circuit 201 can receive communication with the camera 100 will be described below.

In a case where the camera control circuit A 101 determines that the accessory 200 has been attached to the camera 100, the camera control circuit A 101 sets the power control signal CNT_VACC1 to high level to turn on the output of the accessory power supply circuit A131. The accessory power supply circuit A 131 outputs the accessory power supply VACC when the power control signal CNT_VACC1 becomes high level.

In a case where the accessory 200 receives VACC, the output of the power supply detecting circuit 299 is input to the VCC_ACC_DET terminal of the accessory control circuit 201 as high level. Thereafter, the accessory control circuit 201 outputs the communication request signal /WAKE to low level.

In the camera 100, the camera control circuit A 101 determines that the /WAKE terminal has become low level, and determines that the accessory 200 becomes communicable. The camera control circuit A 101 requests for accessory information through the I2C communication. In the accessory 200, the accessory control circuit 201 transmits the accessory information in response to an accessory information request from the camera 100. After transmitting the accessory information, the accessory control circuit 201 sets the communication request signal /WAKE to high level.

In the camera 100, the camera control circuit A 101 determines the received accessory information and whether or not the attached accessory can be controlled. The camera control circuit A 101 turns on the accessory power supply circuit B 132. After completing various settings for the camera 100, the camera control circuit A 101 notifies the camera control circuit B 102 of the accessory information.

Based on the accessory information, the camera control circuit B 102 notifies the accessory 200 of a control command and controls a function signal through the SPI communication. The accessory control circuit 201 responds to the control command via the SPI communication from the camera 100 and performs control according to the function signal.

The accessory information illustrated in FIG. 4 will be described below. D7-D0 data at address 0x00 is accessory type information indicating the type of accessory. FIG. 6 illustrates an example of accessory information. For example, 0x81 indicates a strobe device, 0x82 indicates an interface conversion adapter device, 0x83 indicates a microphone device, and 0x84 indicates a multi-accessory connection adapter device for attaching a plurality of accessory devices to the camera 100.

D7-D0 data at address 0x01 is information indicating a model number of the accessory 200. The accessory model can be uniquely indicated by the accessory type information described above and this information.

The D7-D0 data at address 0x02 is information indicating the version of the accessory 200 firmware.

D7-D6 data at address 0x03 is information indicating whether or not a supply of the accessory power supply VACC to the accessory 200 is to be requested while an unillustrated power supply switch of the camera 100 is turned off. In a case where the information is 0, no power supply is requested. In a case where the information is 1, a power supply is requested by the accessory power supply circuit A 131. In a case where the information is 2, a power supply is requested by the accessory power supply circuit B 132.

D5-D4 data at address 0x03 is information indicating whether or not to request the accessory 200 for a supply of the accessory power VACC in a case where the camera 100 is in the low power consumption mode. In a case where this information is 0, it means that no power supply is necessary. In a case where the information is 1, it means a power supply request by the accessory power supply circuit A 131, and in a case where the information is 2, it means a power supply request by the accessory power supply circuit B 132.

D3-D2 data at address 0x03 is information indicating whether the accessory 200 has the battery 205. In a case where this information is 0, it means that the accessory 200 has no battery. In a case where this information is 1, it means that the accessory 200 has the battery 205.

D1-D0 data at address 0x03 is information indicating whether the accessory 200 has a function of charging the battery 205. In a case where this information is 0, it means that the accessory 200 has no charging function. In a case where this information is 1, it means that the accessory 200 has the charging function.

D7-D0 data at address 0x04 is information indicating the required power for the accessory power supply VACC supplied from the camera 100. A value obtained by multiplying this information by 10 indicates a current value. For example, in a case where this information is 10, the current value is 100 mA, and in a case where this information is 100, the current value is 1A.

In order to reduce an information amount of this information, this information may be simply associated with an arbitrary current value. For example, in a case where this information is 0, it may mean 100 mA, in a case where this information is 1, it may mean 300 mA, in a case where this information is 3, it may mean 450 mA, and in a case where this information is 4, it may mean 600 mA.

D7 data at address 0x05 is information indicating whether or not the accessory 200 is in a firmware update mode state. In a case where the information is 0, it means that the accessory 200 is not in the firmware update mode state, and in a case where it is 1, it means that the accessory 200 is in the firmware update mode state.

D6 data at address 0x05 is information indicating whether or not the accessory 200 has a firmware update function. In a case where the information is 0, it means that the accessory 200 has no firmware update function. In a case where the information is 1, it means that the accessory 200 has the firmware update function.

D5-D4 data at address 0x05 is information indicating whether or not an operation of the accessory 200 that is attached to an intermediate (connection) accessory is to be permitted (supported). In a case where the information is 0, it means that the operation is not permitted, and in a case where it is 1, it means that the operation is permitted.

D3-D2 data at address 0x05 is information indicating whether or not the accessory 200 needs the camera 100 to confirm an attachment state of the intermediate accessory in a case where the camera 100 is started. In a case where the information is 0, it means that the confirmation is unnecessary, and in a case where it is 1, it means that the confirmation is necessary.

D1-D0 data at address 0x05 is information indicating whether or not the accessory 200 supports a command notification by the I2C communication. In a case where this information is 0, it means that the command notification is not supported, and in a case where it is 1, it means that the command notification is supported.

D5-D4 data at address 0x06 is information indicating a communication method that can be used to notify the camera 100 of a factor of a communication request after the accessory 200 notifies the camera 100 of communication request signal /WAKE. In a case where the information is 0, it means that the I2C communication method is supported. In a case where the information is 1, it means that the SPI communication method is supported. In a case where the information is 2, it means that both the I2C communication method and the SPI communication method are supported.

D3-D0 data at address 0x06 is information indicating whether or not the accessory 200 has functions corresponding to the FNC1 signal, the FNC2 signal, the FNC3 signal, and the FNC4 signal. D0 data corresponds to the FNC1 signal, D1 data corresponds to the FNC2 signal, D2 data corresponds to the FNC3 signal, and D3 data corresponds to the FNC4 signal. In a case where the value is 0, it means that the accessory 200 does not have that function. In a case where the value is 1, the accessory 200 has that function.

D7 data at address 0x0A is information indicating whether or not the accessory 200 requests the camera 100 for a start in a case where the accessory 200 notifies the camera 100 of the communication request signal /WAKE. In a case where the information is 0, it means that the start is requested, and in a case where it is 1, it means that the start is not requested.

D6-D0 data at address 0x0A is information indicating a factor of the communication request signal /WAKE of which the accessory 200 notifies the camera 100. FIG. 7 illustrates an example of factors of the communication request signal /WAKE. FIG. 7 illustrates an example in which the accessory 200 is a microphone device. For example, a factor number 0x00 is a number indicating that a menu call switch in the operation switch 212 has been pressed.

A factor number 0x01 is a number indicating that the accessory 200 has completed an output control of an audio signal. A factor number 0x02 is a number indicating that the accessory 200 has completed mute processing of the audio signal. Thus, the camera 100 can be notified of information on the generating factor of the communication request signal /WAKE.

D1 data at address 0x0C is information indicating an SPI communication protocol supported by the accessory 200, and in a case where the information is 0, it means that the accessory 200 supports SPI protocol A, and in a case where it is 1, it means that the accessory 200 supports SPI protocol B.

D0 data at address 0x0C is information indicating a control logic of the CS signal in the SPI communication supported by the accessory 200. In a case where the information is 0, it means that the CS signal is a low-active logic, and in a case where it is 1, it means that the CS signal is a high-active logic.

D7-D0 data at address 0x0D is information indicating the time required as a communication byte interval in a case where the accessory 200 performs communication in accordance with the SPI protocol A and the D7 data at the address 0x05 is 0 or the accessory 200 is not in the firmware update mode state.

D7-D0 data at address 0x0E is information indicating the time required as a communication byte interval in a case where the accessory 200 performs communication in accordance with the SPI protocol A and the D7 data at the address 0x05 is 1 or the accessory 200 is in the firmware update mode state.

FIGS. 8A and 8B are tables illustrating a relationship between information on data at the address 0x0D and data at the address 0x0E and the time between communication bytes. FIG. 8A illustrates the relationship between the time between communication bytes and the data at the address 0x0D, and FIG. 8B illustrates the relationship between the time between communication bytes and the data at the address 0x0E.

D7-D0 data at address 0x0F is information indicating a checksum.

Figure 9:
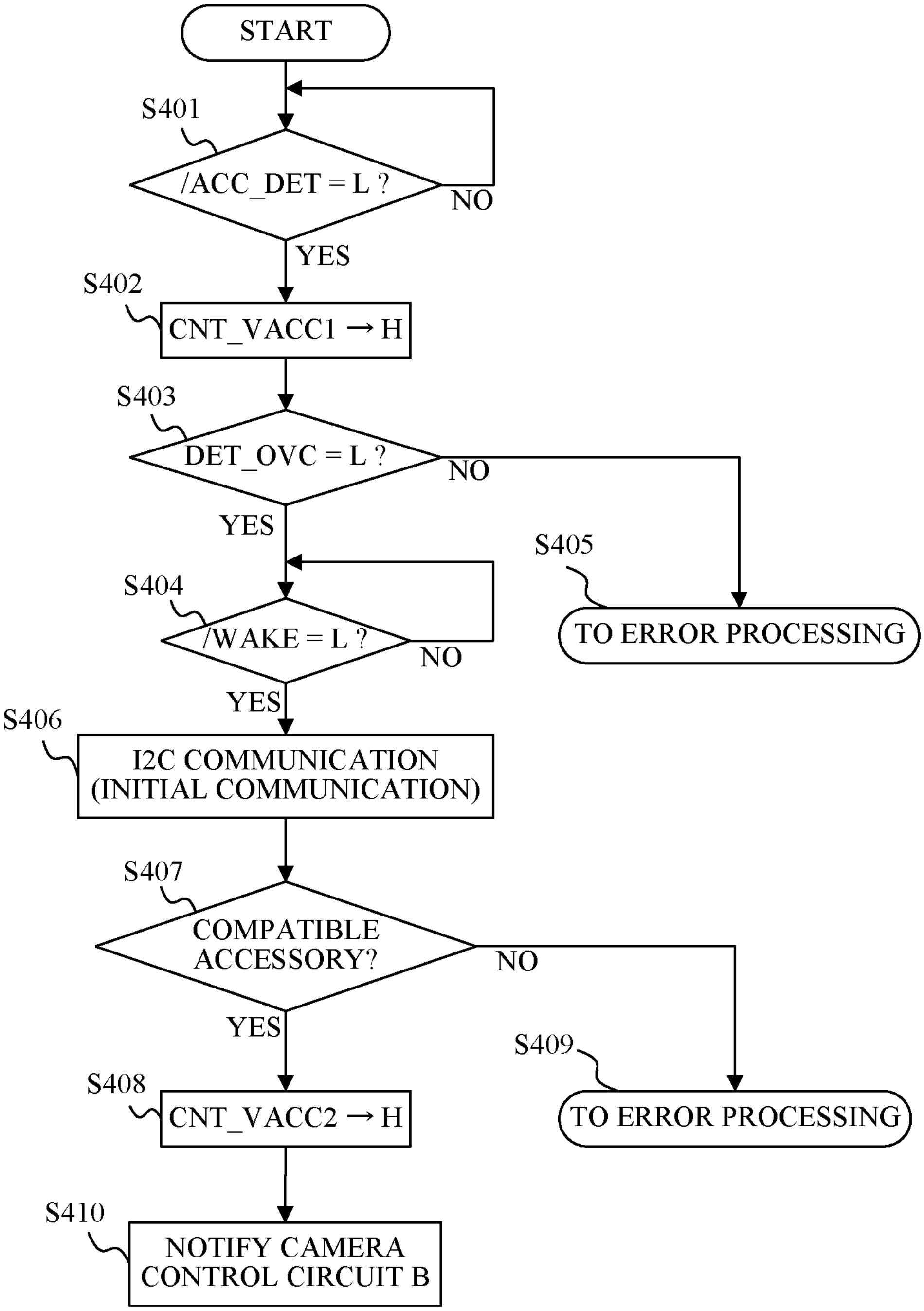
FIG. 9 illustrates an example of an operation flow of the camera according to this embodiment.

FIG. 9 is a flowchart illustrating processing of the camera control circuit A101 from when the accessory 200 is attached to the camera 100 to when the functions of the accessory 200 are enabled.

In S401, the camera control circuit A 101 monitors the signal level of the accessory attachment detecting signal /ACC_DET and determines whether or not the accessory 200 is attached to the camera 100. In a case where the signal level of the accessory attachment detecting signal /ACC_DET is high, the camera control circuit A 101 determines that the accessory 200 is not attached, the flow returns to S401, and the camera control circuit A 101 performs the detection operation again. In a case where the signal level of the accessory attachment detecting signal /ACC_DET is low, the camera control circuit A 101 determines that the accessory 200 has been attached, and the flow proceeds to S402.

In S402, the camera control circuit A 101 controls the power control signal CNT_VACC1 to high level in order to turn on the output of the accessory power supply circuit A 131, and the flow proceeds to S403. The accessory power supply circuit A 131 outputs the accessory power supply VACC in a case where the power control signal CNT-_VACC1 becomes high level.

In S403, the camera control circuit A 101 monitors the signal level of overcurrent detecting signal DET_OVC and determines whether overcurrent is flowing. In a case where the signal level of the overcurrent detecting signal DET_OVC is low, the camera control circuit A 101 determines that no overcurrent is flowing, and the flow proceeds to S404. In a case where the signal level of the overcurrent detecting signal DET_OVC is high, the camera control circuit A 101 determines that the overcurrent is flowing, and the flow proceeds to S405 to perform error processing.

In S404, the camera control circuit A 101 monitors the signal level of the communication request signal /WAKE, which is a notification signal from the accessory 200, and determines whether initialization of the accessory 200 is completed. In a case where the signal level of the communication request signal /WAKE is low, the camera control circuit A 101 determines that initialization has been completed, and the flow proceeds to S406. In a case where the signal level of the communication request signal /WAKE is high, the camera control circuit A 101 determines that the initialization has not yet been completed, the flow returns to S404, and the camera control circuit A 101 performs the detection operation again.

In S406, the camera control circuit A101 performs I2C communication with the accessory 200 to read 15 bytes of accessory information (initial communication), and the flow proceeds to S407.

In S407, the camera control circuit A 101 determines whether or not the attached accessory 200 is a device compatible with the camera 100 based on the accessory information read in S406. In a case where the camera control circuit A 101 determines that the attached accessory 200 is a compatible accessory, the flow proceeds to S408. In a case where the camera control circuit A 101 determines that the attached accessory 200 is an incompatible accessory, the flow proceeds to S409 to perform error processing.

In S408, the camera control circuit A 101 performs control for changing the power supply control signal CNT_VACC2 to a high level in order to turn on the output of the accessory power supply circuit B 132. Then, the flow proceeds to S410. The accessory power supply circuit B 132 outputs the accessory power supply VACC in a case where the power supply control signal CNT_VACC2 becomes at the high level. In the configuration according to this embodiment, in a case where control is performed so as to make both the power supply control signals CNT_VACC1 and CNT-_VACC2 at high levels, the output from the accessory power supply circuit B 132 is supplied to the accessory power supply VACC.

In S410, the camera control circuit A 101 notifies the camera control circuit B 102 of the accessory information read out in S406, and completes the activation flow in response to the attachment of the accessory 200.

Figure 10:
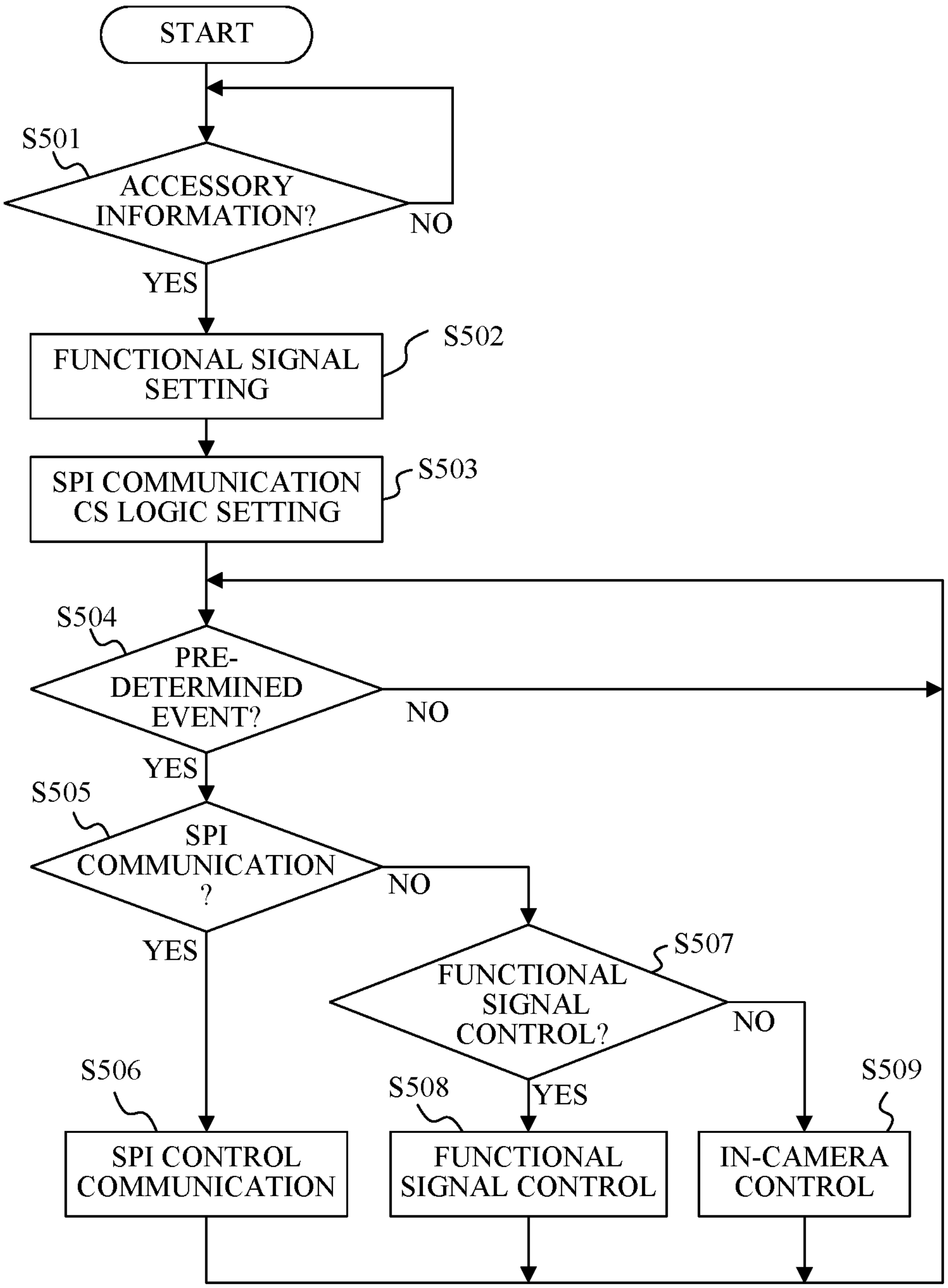
FIG. 10 illustrates an example of an operation flow of the camera according to this embodiment.

FIG. 10 is a flowchart illustrating processing of the camera control circuit B 102 from when the accessory 200 is attached to the camera 100 to when the functions of the accessory 200 are enabled.

In S501, the camera control circuit B 102 determines whether accessory information is notified from the camera control circuit A 101. In a case where the accessory information has not been notified, the flow returns to S501, and the camera control circuit B 102 performs the detection operation again. In a case where the accessory information has been notified, the flow proceeds to S502.

In S502, the camera control circuit B 102 sets the function signals FNC1 to FNC4 based on the accessory information notified from the camera control circuit A 101.

In a case where it is notified that the accessory 200 is a microphone device, the camera control circuit B 102 is set so that FNC1 functions as voice data clock signal BCLK, FNC2 functions as voice data channel signal LRCLK, and FNC3 functions as voice data signal SDATA. As another example, in a case where it is notified that the accessory 200 is a strobe device, the camera control circuit B 102 is set so that FNC 4 functions as strobe emission synchronization signal XOUT.

For functional signals that do not require control over the accessory 200, the camera control circuit B 102 makes predetermined settings so as not to interfere with operations of the camera 100 and the accessory 200.

In S503, the camera control circuit B 102 sets the control logic of the SPI communication CS signal based on the accessory information notified from the camera control circuit A 101.

In S504, the camera control circuit B 102 determines whether a predetermined event for the accessory 200 has occurred. In a case where no event has occurred, the flow returns to S504, and the camera control circuit B 102 performs the detection operation again. In a case where an event has occurred, the flow proceeds to S505.

In S505, the camera control circuit B 102 determines whether the event detected at S504 requires SPI communication with the accessory 200. In a case where the detected event requires the SPI communication, the flow proceeds to S506. In a case where the detected event does not require SPI communication, the flow proceeds to S507.

In S507, the camera control circuit B 102 determines whether or not the event detected in S504 is an event that requires control using the function signal with the accessory 200. In a case where the detected event is an event that requires control using the function signal, the flow proceeds to S508. In a case where the detected event does not require control using the function signal, the flow proceeds to S509.

In S506, the camera control circuit B 102 performs the SPI communication with the accessory 200. In a case where the accessory 200 is a microphone device, the SPI communication executed in S506 includes instruction communication for turning on the microphone operation and instruction communication for turning off the microphone operation. The SPI communication further includes instruction communication for switching the sound collection directivity of the microphone, instruction communication for switching the equalizer function of the microphone, and the like. In a case where the accessory 200 is a strobe device, the SPI communication includes communication for reading strobe setting information, communication for notifying the setting information to the strobe, and the like. In a case where the predetermined SPI communication is completed in S506, the flow returns to S504, and the camera control circuit B 102 performs the event detection operation again.

In S508, the camera control circuit B 102 controls the accessory 200 using the function signal. Control using the function signal executed in S508 includes the following controls: In a case where the accessory 200 is a microphone device, the camera control circuit B 102 outputs the audio data clock signal BCLK of FNC1 and the audio data channel signal LRCLK of FNC2, and takes the audio data signal SDATA of FNC3. Thereby, the camera 100 can acquire audio data from the accessory 200. In a case where the accessory 200 is a strobe device, the camera control circuit B 102 controls the strobe emission synchronization signal XOUT of FNC 4 at a predetermined timing. Thereby, the strobe can be notified of a light emission instruction. In a case where the control using the predetermined function signal is completed in S508, the flow returns to S504, and the camera control circuit B 102 performs the event detection operation again.

In S509, the camera control circuit B 102 performs predetermined in-camera control according to the event detected in S504. For example, in a case where the accessory 200 is a microphone device, the in-camera control executed in S509 includes control of starting and ending recording of audio data in the recording memory 126, control of equalizer processing for audio data, and the like. In a case where the accessory 200 is a strobe device, it can be mentioned that the in-camera control includes photometry control for accumulating and acquiring light emitted by the strobe by the image sensor 122, calculation control of a light emission amount instruction value of the strobe, and the like. In a case where the predetermined in-camera control is completed in S509, the flow returns to S504, and the camera control circuit B 102 performs the event detection operation again.

As described above, the camera 100 can control the attached accessory 200 according to the flow in FIGS. 9 and 10.

Figure 12:
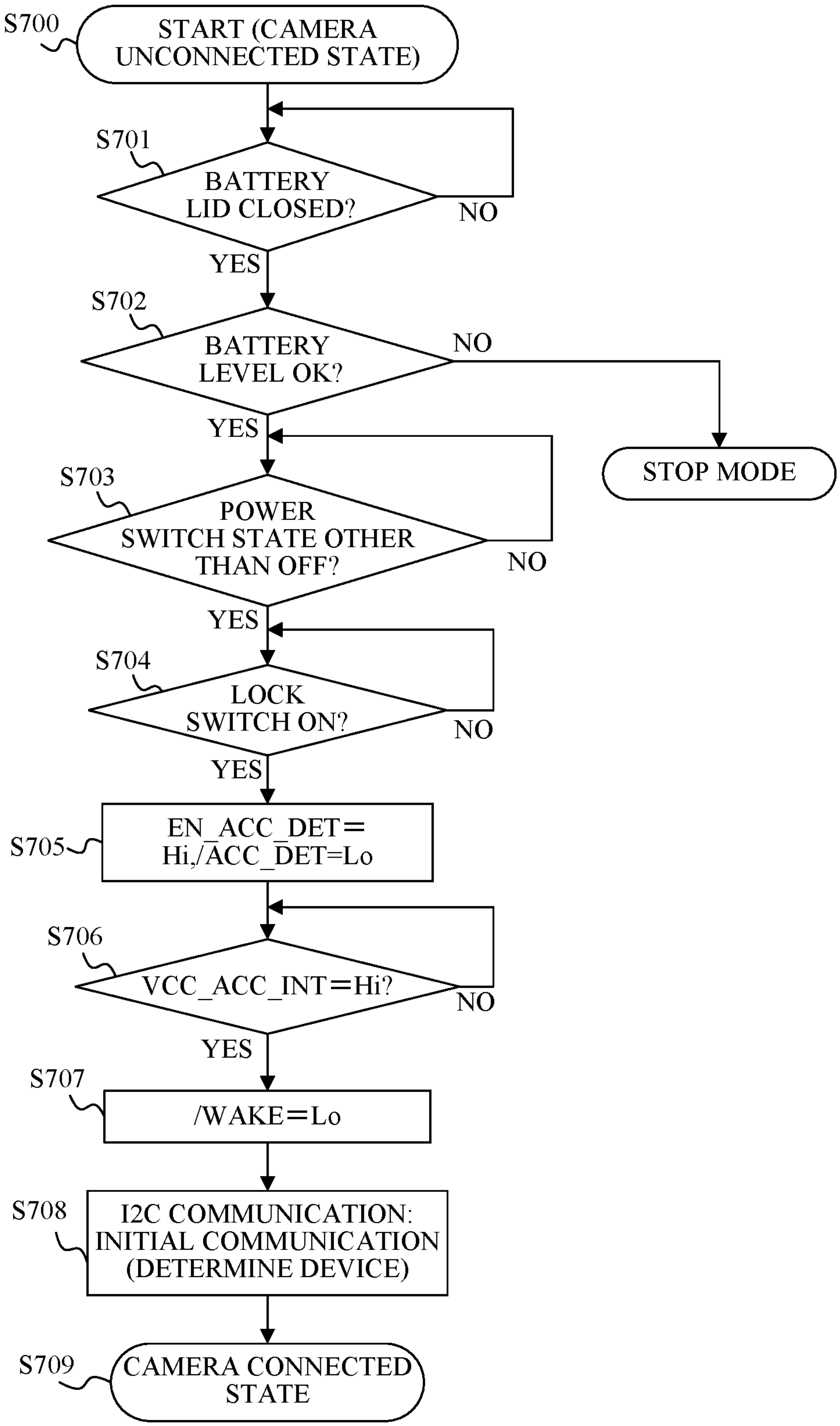
FIG. 12 illustrates an example of an operation flow according to this embodiment in a case where the accessory is connected to the camera.

Referring now to FIG. 12, a description will now be given of details from when the accessory control circuit 201 determines that the accessory control circuit 201 can receive communication with the camera 100 and that the lock switch 297 is turned on to when the accessory control circuit 201 controls the connection signal control circuit 296.

In S700, the accessory control circuit 201 starts determining whether or not the accessory control circuit 201 can receive communication with the camera 100.

In S701, the accessory control circuit 201 determines whether the battery lid is closed by reading the signal level of the battery lid state detecting signal BATDORCLS connected to the battery lid switch 298. In a case where the signal level of the battery lid state detecting signal BATDORCLS is high, the accessory control circuit 201 determines that the battery lid is closed, and the flow proceeds to S702. In a case where the signal level of the battery lid state detecting signal BATDORCLS is low, the accessory control circuit 201 determines that the battery lid is opened, and the flow returns to S701.

In S702, the accessory control circuit 201 communicates with the battery microcomputer provided in the battery 205, receives information on the battery level, and determines whether the battery level of the battery 205 is sufficient to operate the accessory 200. Here, in a case where the received battery level is higher than 0%, the accessory control circuit 201 determines that the battery 205 has battery level that allows the accessory 200 to operate, and the flow proceeds to S703. In a case where the battery level is 0%, the accessory control circuit 201 determines that the accessory 200 cannot operate, and the accessory control circuit 201 shifts from the operating mode to the stop mode. In this case, since the battery level is 0%, the accessory control circuit 201 remains in the stop mode until the battery 205 is replaced with a battery with battery level higher than 0%. After the battery 205 is replaced and the battery lid is closed, the accessory control circuit 201 again starts determining whether or not the accessory control circuit 201 can receive communication with the camera 100 in S700. The battery level that can operate the accessory 200 means that in a case where the accessory 200 can receive the battery level from the battery 205, the battery level received from the battery 205 is equal to or higher than the battery level that can operate the accessory 200. The battery level that can operate the accessory 200 is a state in which in a case where the accessory 200 cannot receive the battery level from the battery 205, battery voltage obtained after the processor executes a load test is equal to or higher than a predetermined value.

In S703, the accessory control circuit 201 reads the signal level of the terminal to which the power switch 203 is connected, and determines the state of the power switch 203. In a case where the power switch 203 is in the turning-on position, the flow proceeds to S704. In a case where the power switch 203 is in the turning-off position, the flow returns to S703 and the accessory control circuit 201 waits for the power switch 203 to be in the turning-on position. This embodiment sets the states of the power switch 203 to the turning-on position and the turning-off position. In a case where the state of the power switch 203 is the lock position, which is a state in which the power is turned on but the operation of the accessory 200 is not accepted, the branching of S703 may be determined based on the fact that the power switch 203 is in a position other than the turning-off position.

In S701 to S703, the accessory control circuit 201 determines that the battery lid is closed, the battery level is higher than 0%, and the power switch 203 is not turned off, and determines whether the accessory 200 can receive communication with the camera 100.

In S704, the accessory control circuit 201 determines the state of the lock switch 297 by reading the signal level of the lock switch state detecting signal /SHOELOCKSW_DET. In a case where the signal level (potential) of lock switch state detecting signal /SHOELOCKSW_DET is high (predetermined potential), the state of lock switch 297 is detected to be turned off (unlocked or unfixed), and the flow returns to S704. In a case where the signal level (potential) of lock switch state detecting signal /SHOELOCKSW_DET is low (GND potential), the state of lock switch 297 is detected to be turned on (locked or fixed), and the flow proceeds to S705.

This embodiment uses the interrupt port of the accessory control circuit 201 to detect the state of the lock switch 297. Thereby, changes in the states of the battery lid switch 298, the power switch 203, and the lock switch 297 can be detected not only in a case where the accessory 200 is in the operating mode but also in the low power consumption mode. Even if the lock switch 297 is changed from the turning-off (unlocked or unfixed) state to the turning-on (locked or fixed) state in the low power consumption mode, the state of the lock switch 297 can be detected.

In S705, the accessory control circuit 201 controls the connection signal control circuit 296 (sets the output of the EN_ACC_DET terminal to high level), and sets the accessory attachment detecting signal /ACC_DET to the GND level (ground potential) as low level. As a result, the camera 100 can detect the attachment of the accessory 200.

In S706, the accessory control circuit 201 determines whether or not the output of the power supply detecting circuit 299 is input, based on the state of the VCC_ACC_INT terminal and the power receiving state of VACC. In a case where the VCC_ACC_INT terminal is at high level and VACC is being received, the flow proceeds to S707. In a case where the VCC_ACC_INT terminal is at low level and VACC is not being received, the flow returns to S706 to wait for VACC power reception. After the accessory attachment detecting signal /ACC_DET is set to the GND level (ground potential) as low level in S705, in a case where the camera 100 is connected and the power switch of the camera 100 is in the turning-on position, power is supplied to VACC. Power is not supplied to VACC in a case where the camera 100 is not connected, or in a case where the camera 100 is connected but the power switch is in the turning-off position. The output of the power supply detecting circuit 299 is connected to an interrupt port or the like of the accessory control circuit 201, and even if the accessory 200 is in the low power consumption mode, the accessory control circuit 201 can detect changes in the output of the power supply detecting circuit 299.

In S707, the accessory control circuit 201 outputs a communication request signal /WAKE. Here, there is a restriction on a period from when the camera 100 supplies power to VACC in S706 to when the communication request signal /WAKE is received from the accessory 200. In a case where the accessory 200 does not transmit the communication request signal /WAKE within two seconds after receiving power from the VACC, the camera 100 displays an error. Even in this case, the accessory control circuit 201 can detect changes in the output of the power supply detecting circuit 299 even when the accessory 200 is in the low power consumption mode as described above. Therefore, the communication request signal /WAKE can be transmitted before the camera 100 issues an error display.

In S708, the accessory control circuit 201 responds to the I2C communication from the camera 100 and transmits 15 bytes of accessory information. The accessory information includes various information illustrated in FIG. 4 as described above. In a case where the communication in S708 is completed, the flow proceeds to S709, and the accessory control circuit 201 controls the communication request signal /WAKE to high output.

The above completes the initial communication between the camera 100 and the accessory 200, and the accessory 200 can be used with the camera 100. In a case where the camera 100 is in operating mode, then the SPI communication is performed. At this time, in a case where the accessory 200 is in the low power consumption mode, assertion of CS at the start of the SPI communication causes the accessory 200 to transition to the operating mode. In a case where the camera 100 is in the low power consumption mode, the SPI communication is not performed. In a case where the accessory 200 is in the low power consumption mode, the low power consumption mode is maintained and an event is waited. In a case where the accessory 200 is in the operating mode, the operating mode is maintained and an event is waited. Since the accessory 200 is connected to the camera 100, request communication to the camera 100 (camera activation request, request to display the menu screen of the accessory on the camera display, etc.) is enabled.

Figure 11:
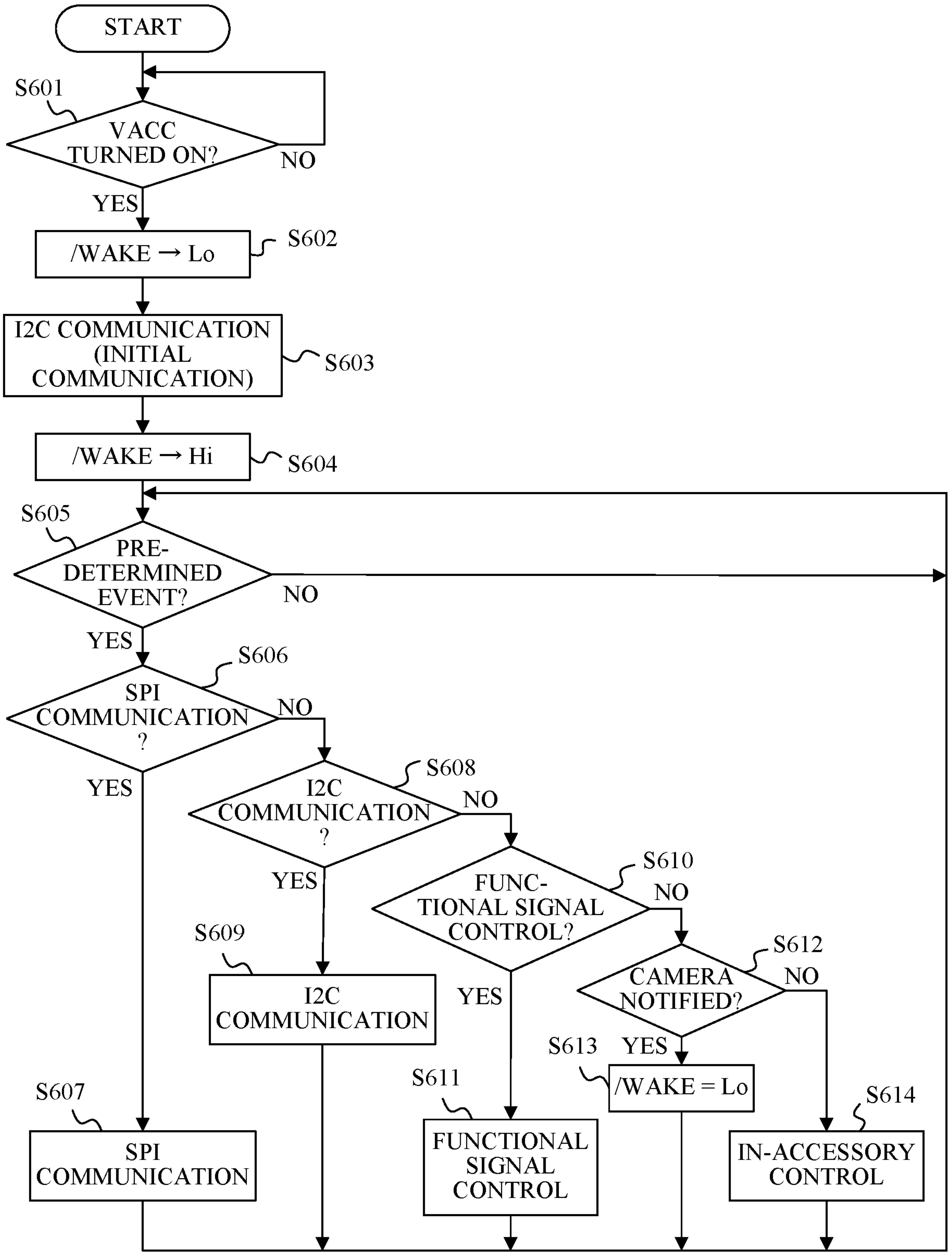
FIG. 11 illustrates an example of an operation flow of an accessory according to this embodiment.

FIG. 11 is a flowchart illustrating processing of the accessory control circuit 201 from when the accessory 200 is attached to the camera 100 to when the functions of the accessory 200 are enabled.

The accessory control circuit 201 determines that the accessory control circuit 201 can receive communication with the camera 100 and that the lock switch 297 is turned on, and controls the connection signal control circuit 296. As a result, by setting the accessory attachment detecting signal /ACC_DET to the GND level (ground potential) as low level, the flow after the camera 100 detects the attachment of the accessory 200 will be described.

In S601, the accessory control circuit 201 waits for the accessory power supply VACC in the camera 100 to be turned on. In this embodiment, since the accessory 200 has the battery 205, the accessory control circuit 201 waits for the output of the power supply detecting circuit 299 to be input to the accessory control circuit 201.

Even if the accessory control circuit 201 is configured to monitor the voltage value of the accessory power supply VACC, it is possible to detect that the accessory power supply VACC has been turned on. In this case, in addition to the terminal for monitoring the voltage value of VACC, it is necessary to connect to the interrupt port so that the accessory control circuit 201 can be activated by the input of VACC.

In S602, the accessory control circuit 201 controls the communication request signal /WAKE to low output and notifies the camera 100 that communication is available.

In S603, the accessory control circuit 201 responds to the I2C communication from the camera 100 and transmits 15 bytes of accessory information. The accessory information includes various information illustrated in FIG. 4 as described above.

In a case where the communication in S603 is completed, the accessory control circuit 201 controls the communication request signal /WAKE to high output (S604).

In a case where the initial communication is completed, the accessory control circuit 201 detects whether a predetermined event has occurred in S605. In a case where no event has occurred, the flow returns to S605, and the accessory control circuit 201 performs the detection operation again. In a case where an event has occurred, flow proceeds to S606.

In S606, the accessory control circuit 201 determines whether the event detected in S605 requires SPI communication with the camera 100. In a case where the detected event requires the SPI communication, the flow proceeds to S607. In a case where the detected event does not require the SPI communication, the flow proceeds to S608.

In S608, the accessory control circuit 201 determines whether the event detected in S605 requires I2C communication with the camera 100. In a case where the detected event requires the I2C communication, the flow proceeds to S609. In a case where the detected event does not require the I2C communication, flow proceeds to S610.

In S610, the accessory control circuit 201 determines whether the event detected at S605 is an event for performing control using a function signal. In a case where the detected event is an event that requires control using the function signal, the flow proceeds to S611. In a case where the detected event does not require control using the function signal, flow proceeds to S612.

In S612, the accessory control circuit 201 determines whether or not the event detected at S605 is an event for notifying the camera using the communication request signal /WAKE. In a case where the detected event is an event requiring notification to the camera by the communication request signal /WAKE, the flow proceeds to S613. In a case where the detected event is not an event requiring notification to the camera by the communication request signal /WAKE, the flow proceeds to S614.

In S607, the accessory control circuit 201 performs SPI communication with the camera 100. In a case where the communication request signal /WAKE is in the low output state during the SPI communication, the accessory control circuit 201 controls the communication request signal /WAKE to the high output state after the SPI communication. For example, in a case where the accessory 200 is a microphone device, the SPI communication executed in S607 includes instruction communication for turning on the microphone operation from the camera 100 and instruction communication for turning off the microphone operation. The SPI communication includes instruction communication for switching the sound collection directivity of the microphone, instruction communication for switching the equalizer function of the microphone, and the like. In a case where the accessory 200 is a strobe device, the SPI communication includes communication for reading strobe setting information, communication for notifying the setting information to the strobe, and the like. In a case where the predetermined SPI communication is completed in S607, the flow returns to S605, and the accessory control circuit 201 performs the event detection operation again.

In S609, the accessory control circuit 201 performs I2C communication with the camera 100. In a case where the communication request signal /WAKE is in the low output state during the I2C communication, the accessory control circuit 201 controls the communication request signal /WAKE to the high output state after the I2C communication. The I2C communication executed in S609 includes, for example, reading communication of a communication request factor in response to a communication request signal /WAKE signal notification sent from the accessory control circuit 201 to the camera 100, and the like. In a case where the predetermined I2C communication is completed in S609, the flow returns to S605, and the accessory control circuit 201 performs the event detection operation again.

In S611, the accessory control circuit 201 controls the camera 100 using the function signal. A description will now be given of the control using the function signal executed in S611 in a case where the accessory 200 is a microphone device. In this case, the reception of the audio data clock signal BCLK of FNC1 and the audio data channel signal LRCLK of FNC2 output from the camera 100 is controlled, and the output of the audio data signal SDATA of FNC3 is controlled in synchronization with these signals. In a case where the accessory 200 is a strobe device, strobe light emission control can be performed by controlling reception of the strobe light emission synchronization signal XOUT of the FNC 4. In a case where the control using the function signal is completed in S611, the flow returns to S605, and the accessory control circuit 201 performs the event detection operation again.

In S613, the accessory control circuit 201 stores the communication request factor number to the camera 100 corresponding to the event that occurred in S605 in the unillustrated volatile memory in the accessory 200, and controls the output of the communication request signal /WAKE to low level. In the communication request factor number, a unique number is assigned to each factor content as described above with reference to FIG. 7. In a case where the low output control of the communication request signal /WAKE is completed in S613, the flow returns to S605, and the accessory control circuit 201 performs the event detection operation again.

In S614, the accessory control circuit 201 performs in-accessory control according to the event that occurred at S605. The in-accessory control executed in S614 includes, for example, battery level detection control in a case where the accessory 200 has the battery 205, detection control of the operation switch 212, and the like. In a case where the in-accessory control is completed in S614, the flow returns to S605, and the accessory control circuit 201 performs the event detection operation again.

As described above, the accessory 200 can perform the functional operation after the accessory 200 is attached to the camera 100 according to the flow of FIG. 11.

Figure 13:
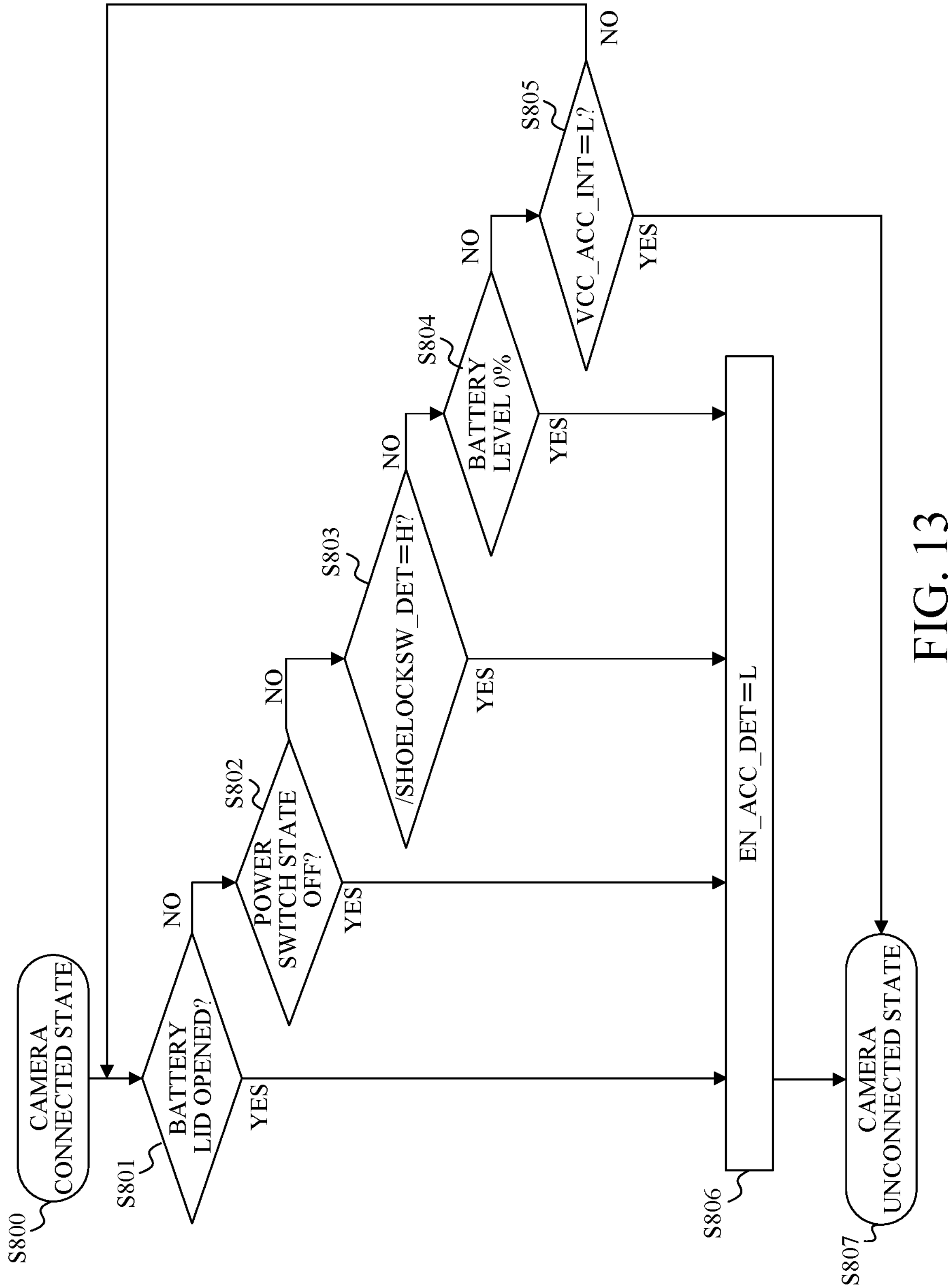
FIG. 13 illustrates an example of an operation flow according to this embodiment in a case where the accessory is disconnected from the camera.

Referring now to FIG. 13, a description will be given of the accessory control circuit 201 determines that the accessory control circuit 201 cannot receive communication with the camera 100 or that the lock switch 297 is turned off, and controls the connection signal control circuit 296. After this determination, the accessory control circuit 201 outputs low level from the accessory attachment detecting signal control EN_ACC_DET so that the accessory attachment detecting signal /ACC_DET becomes high level (predetermined potential). Thereafter, in the camera 100, the camera control circuit A 101 reads the signal level of the accessory attachment detecting signal /ACC_DET. Since the signal level (potential) of the accessory attachment detecting signal /ACC_DET is high (predetermined potential), it is detected that the accessory 200 is not attached.

The flow in FIG. 13 starts from the camera connected state in which the camera 100 and the accessory 200 are connected (S800).

In S801, the accessory control circuit 201 reads the signal level of the battery lid state detecting signal BATDORCLS connected to the battery lid switch 298 to determine whether the battery lid has been opened. In a case where the signal level of the battery lid state detecting signal BATDORCLS is high, the accessory control circuit 201 determines that the battery lid is closed, and the flow proceeds to S802. In a case where the signal level of the battery lid state detecting signal BATDORCLS is low, the flow proceeds to S806 because the battery lid is open.

In S802, the accessory control circuit 201 reads the signal level of the terminal to which the power switch 203 is connected and determines the state of the power switch 203. In a case where the power switch 203 is not in the turning-off position, the flow proceeds to S803. In a case where the power switch 203 is in the turning-off position, the flow proceeds to S806.

In S803, the accessory control circuit 201 determines the state of the lock switch 297 by reading the signal level of the lock switch state detecting signal /SHOELOCKSW_DET. In a case where the signal level (potential) of the lock switch state detecting signal /SHOELOCKSW_DET is high (predetermined potential), the state of lock switch 297 is detected to be turned off (unlocked or unfixed), and the flow proceeds to S806. In a case where the signal level (potential) of the lock switch state detecting signal /SHOELOCKSW_DET is low (GND potential), the state of lock switch 297 is detected to be turned on (locked or fixed), and the flow proceeds to S804.

In S804, the accessory control circuit 201 communicates with the battery microcomputer provided in the battery 205, receives information on the battery level, and determines whether the battery level of the battery 205 is sufficient to operate the accessory 200. Here, in a case where the received battery level is greater than 0%, it is determined that the battery 205 has sufficient battery level to operate the accessory 200, and the flow proceeds to S805. In a case where the battery level is 0%, it is determined that the accessory 200 cannot be operated, the flow goes through S806, and the accessory control circuit 201 shifts from the operating mode to the stop mode.

In S805, the accessory control circuit 201 determines whether the output of the power supply detecting circuit 299 is input, thereby determining whether VACC is receiving power. In a case where VACC is being received, the flow proceeds to S801, and the accessory control circuit 201 repeats determination of state change. In a case where it is determined that VACC has not been received, the flow proceeds to S807. In addition to turning off the power switch of the camera 100, power supply from the camera 100 to the VACC is stopped because the battery lid of the camera 100 is opened or the card lid for storing the recording card is opened. In this case, the power switch is turned on, or the battery lid or card lid is closed. Thereby, the camera control circuit A 101 immediately detects that the accessory attachment detecting signal /ACC_DET is at the GND level, outputs the accessory power supply VACC, and quickly performs the connection sequence.

In S806, the battery lid switch 298, the power switch 203, the lock switch 297, and the battery level have changed, and the accessory control circuit 201 cannot receive communication with the camera 100, or the lock switch 297 is turned off. In S806, the accessory control circuit 201 outputs low level from the accessory attachment detecting signal control EN_ACC_DET so that the accessory attachment detecting signal /ACC_DET becomes high level (predetermined potential). Thereafter, in the camera 100, the camera control circuit A 101 reads out the signal level of the accessory attachment detecting signal /ACC_DET and determines that the accessory 200 is not attached because the signal level (potential) of the accessory attachment detecting signal /ACC_DET becomes high level (predetermined potential). Thereafter, power supply to the VACC from the camera 100 is stopped.

In S807, the accessory control circuit 201 determines that the camera is not connected. In a case where the flow proceeds to S807, the flow passes S806 or S805. In a case where the flow passes S806, it is determined that the accessory control circuit 201 cannot receive communication with the camera 100, or that the lock switch 297 is turned off. On the other hand, in a case where the flow passes S805, the determination is maintained in that the accessory control circuit 201 can receive communication with the camera 100 and the lock switch 297 is turned on.

In this embodiment, the lock switch 297 is provided near the accessory connector 211, and includes a mechanical member such as a lever switch and a member for detecting the state of the switch. An FET may be inserted between the connection signal control circuit 296 and/ACC_DET. In this case, the accessory control circuit 201 cannot directly detect the state change in the lock switch 297. The accessory control circuit 201 cannot determine whether the lock switch 297 is turned off or the lock switch 297 is turned on but the accessory is not attached to the camera 100. The accessory control circuit 201 determines that the accessory is attached to the camera 100 only by the VACC power supply from the camera 100. While the configuration can be simplified, the state can be indirectly detected by VACC, so the responsiveness to removal and the like can be lower than the configuration in which the state of the lock switch 297 can be detected.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-169001, filed on Oct. 21, 2022, which is hereby incorporated by reference herein in its entirety.

What is claimed is:

1. An electronic apparatus comprising:

a battery for supplying power;

a lock unit attachable to a first electronic apparatus; and a processor configured to output, after the electronic apparatus is attached to the first electronic apparatus, a connection signal to the first electronic apparatus indicating that the electronic apparatus has been attached to the first electronic apparatus, wherein the processor is configured to:

determine, based on information about a state of the battery, whether the electronic apparatus can receive communication with the first electronic apparatus, determine whether the lock unit is in a fixed state for locking a connection of the electronic apparatus to the first electronic apparatus or in an unlock state for unlocking the connection, output the connection signal in a case where the electronic apparatus can receive the communication with the first electronic apparatus and the lock unit is in the fixed state, detect a state of a power switch of the battery and a state of a battery level of the battery, and determine that the electronic apparatus can receive the communication with the first electronic apparatus in a case where the power switch is in a state other than a turning-off position and the battery level is in a state that can operate the electronic apparatus, wherein that the state other than the turning-off position includes a state in which the power switch is in a turning-on position and a lock state in which the power switch is in the turning-on position and does not accept an operation of the electronic apparatus.

2. The electronic apparatus according to claim 1, wherein the state that can operate the electronic apparatus includes a state in which in a case where the electronic apparatus can receive the battery level from the battery, the battery level received from the battery is equal to or higher than level that can operate the electronic apparatus.

3. The electronic apparatus according to claim 1, wherein the state that can operate the electronic apparatus includes a state in which in a case where the electronic apparatus cannot receive the battery level from the battery, battery voltage obtained after the processor executes a load test is equal to or higher than a predetermined value.

4. The electronic apparatus according to claim 1, further comprising:

a battery lid to be opened in replacing the battery; and a battery lid detector configured to detect opening and closing of the battery lid, wherein the processor is configured to:

detect a state of the battery lid detector, and determine that the electronic apparatus can receive the communication with the first electronic apparatus in a case where the power switch is in the state other than the turning-off position, the battery level is in the state that can operate the electronic apparatus, and the battery lid detector detects that the battery lid is closed.

5. The electronic apparatus according to claim 4, wherein the battery lid detector is a switch provided near the battery lid.

6. The electronic apparatus according to claim 1, wherein the processor is configured to stop outputting the connection signal in a case where the processor determines at least one of that the electronic apparatus cannot receive the communication with the first electronic apparatus, and that the lock unit is in the unlock state.

7. The electronic apparatus according to claim 1, wherein the processor is configured to output the connection signal in a case where the electronic apparatus can receive the communication with the first electronic apparatus even in a case where the electronic apparatus is in a low power consumption mode that consumes less power than an operating mode, and the lock unit is in the fixed state.

8. The electronic apparatus according to claim 6, wherein the processor is configured to stop outputting the connection signal in a case where the processor determines at least one of that the electronic apparatus cannot receive the communication with the first electronic apparatus even in a case where the electronic apparatus is in a low power consumption mode that consumes less power than an operating mode and that the lock unit is in the unlock state.

9. The electronic apparatus according to claim 7, wherein the processor is configured to continue to output the connection signal even in a case where the electronic apparatus shifts from the operating mode to the low power consumption mode, or the electronic apparatus shifts from the low power consumption mode to the operating mode.

10. The electronic apparatus according to claim 1, further comprising a power supply detector configured to detect whether voltage supplied from the first electronic apparatus is equal to or higher than a predetermined voltage, wherein after the processor outputs the connection signal, the processor is configured to transmit a communication request signal requesting initial communication to the first electronic apparatus in a case where voltage detected by the power supply detector is equal to or higher than a predetermined voltage.

11. The electronic apparatus according to claim 10, wherein the power supply detector includes a reset IC or an AD port of the processor.

12. A connection detecting method of an electronic apparatus that includes a battery for supplying power, and a lock unit and is attachable to a first electronic apparatus via the lock unit, the connection detecting method comprising the steps of:

outputting, after the electronic apparatus is attached to the first electronic apparatus, a connection signal to the first electronic apparatus indicating that the electronic apparatus has been attached to the first electronic apparatus;

determining, based on information about a state of the battery, whether the electronic apparatus can receive communication with the first electronic apparatus; and determining whether the lock unit is in a fixed state for locking a connection of the electronic apparatus to the first electronic apparatus or in an unlock state for unlocking the connection, detecting a state of a power switch of the battery and a state of a battery level of the battery, and determining that the electronic apparatus can receive the communication with the first electronic apparatus in a case where the power switch is in a state other than a turning-off position and the battery level is in a state that can operate the electronic apparatus, wherein the connection signal is output in a case where the electronic apparatus can receive the communication with the first electronic apparatus and the lock unit is in the fixed state, and wherein that the state other than the turning-off position includes a state in which the power switch is in a turning-on position and a lock state in which the power switch is in the turning-on position and does not accept an operation of the electronic apparatus.

13. A non-transitory computer-readable storage medium storing a program that causes a computer to execute the connection detecting method according to claim 12.

* * * * *